United States Patent
Bratspiess et al.

(10) Patent No.: US 11,539,717 B2
(45) Date of Patent: Dec. 27, 2022

(54) SYSTEM, METHOD, AND COMPUTER PROGRAM PRODUCT FOR SECURING A COMPUTER SYSTEM FROM THREATS INTRODUCED BY MALICIOUS TRANSPARENT NETWORK DEVICES

(71) Applicant: CYBER SEPIO SYSTEMS LTD, Tel Aviv (IL)

(72) Inventors: Iftah Bratspiess, Tel-Aviv (IL); Yosef Appleboum, Potomac, MD (US); Bentsi Ben-Atar, Ness Ziona (IL)

(73) Assignee: CYBER SEPIO SYSTEMS LTD, Tel Aviv (IL)

( * ) Notice: Subject to any disclaimer, the term of this patent is extended or adjusted under 35 U.S.C. 154(b) by 255 days.

(21) Appl. No.: 16/647,556

(22) PCT Filed: Sep. 16, 2018

(86) PCT No.: PCT/IL2018/051037
§ 371 (c)(1),
(2) Date: Mar. 16, 2020

(87) PCT Pub. No.: WO2019/053724
PCT Pub. Date: Mar. 21, 2019

(65) Prior Publication Data
US 2020/0280568 A1 Sep. 3, 2020

(30) Foreign Application Priority Data
Sep. 18, 2017 (IL) .......................................... 254573

(51) Int. Cl.
*H04L 29/06* (2006.01)
*G06N 20/00* (2019.01)
*H04L 9/40* (2022.01)

(52) U.S. Cl.
CPC ......... *H04L 63/1416* (2013.01); *G06N 20/00* (2019.01); *H04L 63/0876* (2013.01); *H04L 63/1433* (2013.01)

(58) Field of Classification Search
CPC ............. H04L 63/1416; H04L 63/0876; H04L 63/1433; H04L 63/1475; G06F 21/55; G06N 20/00
See application file for complete search history.

(56) References Cited

U.S. PATENT DOCUMENTS

| 7,877,788 B1 | 1/2011 | Topp et al. |
| 7,899,753 B1 | 3/2011 | Everhart |

(Continued)

FOREIGN PATENT DOCUMENTS

| WO | 2017/046789 A1 | 3/2017 |
| WO | 2017/158593 A1 | 9/2017 |

OTHER PUBLICATIONS

"USB in a Nutshell;" Chapter 1—Making sense of the USB standard; Jul. 4, 2017; pp. 1-5; https://www.beyondlogic.org/usbnutshell/usb1.shtml.

(Continued)

*Primary Examiner* — Joseph P Hirl
*Assistant Examiner* — Thomas A Gyorfi
(74) *Attorney, Agent, or Firm* — Oliff PLC

(57) ABSTRACT

A network security system for detecting MAC'less/transparent devices, the system comprising a data repository aka DB, operative to accumulate "fingerprint" data indicative of expected physical level characteristics for each of plural types of switch-device links (aka link types) interconnecting a switch and a hardware device, wherein at least one pair of links of different types differ from one another at least with respect to the chipset residing in the respective device connected to the respective switch by each respective link;

(Continued)

apparatus for reading physical level characteristics of links in at least one network to be protected; and an output device configured to generate alerts of possible presence of a transparent device along at least one link if the physical level characteristics of the at least one link, as read by the apparatus, is anomalous relative to the "fingerprint" data stored in the data repository.

24 Claims, 14 Drawing Sheets

(56) References Cited

U.S. PATENT DOCUMENTS

| | | | |
|---|---|---|---|
| 8,230,149 | B1 | 7/2012 | Long et al. |
| 8,745,755 | B2 | 6/2014 | Borzycki et al. |
| 8,844,041 | B1* | 9/2014 | Kienzle .................. H04L 45/02 709/224 |
| 9,104,889 | B1 | 8/2015 | Kiswani et al. |
| 9,386,024 | B1 | 7/2016 | Zaitsev et al. |
| 9,785,771 | B1 | 10/2017 | Pratt |
| 10,078,125 | B2 | 9/2018 | Newman et al. |
| 2001/0032295 | A1 | 10/2001 | Tsai et al. |
| 2002/0034273 | A1 | 3/2002 | Spence et al. |
| 2002/0141332 | A1 | 10/2002 | Barnard et al. |
| 2003/0172318 | A1 | 9/2003 | Sugita et al. |
| 2004/0044807 | A1 | 3/2004 | Wang et al. |
| 2005/0114697 | A1 | 5/2005 | Cornell et al. |
| 2006/0242424 | A1 | 10/2006 | Kitchens et al. |
| 2007/0006282 | A1 | 1/2007 | Durham et al. |
| 2009/0002085 | A1 | 1/2009 | Tarng et al. |
| 2009/0161924 | A1 | 6/2009 | Lu et al. |
| 2010/0161927 | A1 | 6/2010 | Sprouse et al. |
| 2010/0268053 | A1 | 10/2010 | Ghesquiere et al. |
| 2011/0173315 | A1 | 7/2011 | Aguren |
| 2011/0302397 | A1 | 12/2011 | Mitola, III |
| 2012/0151102 | A1 | 6/2012 | Cheng et al. |
| 2012/0311207 | A1 | 12/2012 | Powers et al. |
| 2013/0031629 | A1 | 1/2013 | Srivastava et al. |
| 2013/0167254 | A1 | 6/2013 | Gyllenskog |
| 2013/0318607 | A1 | 11/2013 | Reed et al. |
| 2013/0347103 | A1 | 12/2013 | Veteikis et al. |
| 2014/0108792 | A1 | 4/2014 | Borzycki et al. |
| 2014/0215637 | A1 | 7/2014 | Moore et al. |
| 2014/0337558 | A1 | 11/2014 | Powers et al. |
| 2014/0344930 | A1* | 11/2014 | Foley .................. H04L 63/1475 726/23 |
| 2015/0067866 | A1 | 3/2015 | Ibatullin et al. |
| 2015/0262067 | A1 | 9/2015 | Sridhara et al. |
| 2015/0302377 | A1 | 10/2015 | Sweitzer et al. |
| 2015/0365237 | A1 | 12/2015 | Soffer |
| 2016/0080195 | A1 | 3/2016 | Ramachandran et al. |
| 2016/0094574 | A1 | 3/2016 | Hsueh et al. |
| 2016/0117503 | A1* | 4/2016 | Reed .................. G06F 11/3062 726/23 |
| 2016/0349308 | A1 | 12/2016 | Zhang et al. |
| 2016/0373408 | A1 | 12/2016 | Wentworth et al. |
| 2018/0324179 | A1 | 11/2018 | Hou |
| 2019/0312839 | A1* | 10/2019 | Grimm .................. H04L 63/20 |

OTHER PUBLICATIONS

"Payloads;" May 2, 2019; pp. 1-3; https://github.com/hak5darren/USB-Rubber-Ducky/wiki/Payloads.

Nitroz; "How to: Using Cisco Cable Diagnostics;" Jan. 28, 2013; pp. 1-4; https://community.spiceworks.com/how_to/24277-using-cisco-cable-diagnostics.

"General Documentation for Ethernet PHY registers;" Microchip; Mar. 10, 2017; pp. 1-3; http://www.microchip.com/forums/m979258.aspx.

"NetXtreme® / NetLink™ BCM5718 Family Programmer's Guide;" Broadcom Corporation; Jul. 17, 2013; pp. 1-602; https://docs.broadcom.com/docs/1211168564147.

Margaret Rouse; "network access control (NAC);" SearchNetworking; Aug. 15, 2017; pp. 1-5; http://searchnetworking.techtarget.com/definition/network-access-control.

Ralf Neuhaus; "A Beginner's Guide to Ethernet 802.3;" Engineer-to-Engineer Note; EE-269; Jun. 6, 2005; pp. 1-26; http://www.analog.com/media/en/technical-documentation/application-notes/EE-269.pdf.

"Autonegotiation;" Wikipedia; Aug. 30, 2017; pp. 1-3; https://en.wikipedia.org/wiki/Autonegotiation.

"Media-independent interface;" Wikipedia; Aug. 4, 2017; pp. 1-7; https://en.wikipedia.org/wiki/Media-independent_interface.

"Anomaly detection;" Wikipedia; Jul. 7, 2017; pp. 1-5; https://en.wikipedia.org/wiki/Anomaly_detection.

Zimek et al.; "Outlier Detection;" Encyclopedia of Database Systems; Springer Science+Business Media LLC; New York; 2017; pp. 1-5.

Hodge et al.; "A Survey of Outlier Detection Methodologies;" Artificial Intelligence Review, 22 (2); 2004; pp. 85-126.

Dokas et al.; "Data Mining for Network Intrusion Detection;" In Proc. NSF Workshop on Next Generation Data Mining; Computer Science Department; University of Minnesota; Nov. 2002; pp. 21-30.

Dargin; "Increase your network security: Deploy a honeypot;" NetworkWorld; Oct. 24, 2017; pp. 1-8; https://www.networkworld.com/article/3234692/increase-your-network-security-deploy-a-honeypot.html.

"Cisco Identity Services Engine;" pp. 1-9; https://www.cisco.com/c/en/us/products/security/identity-services-engine/index.html.

"A New Way to Look at Network Access Control;" Jul. 4, 2017; pp. 1-4; https://www.forescout.com/solutions/network-access-control/.

U.S. Appl. No. 16/078,052, filed Aug. 21, 2018 in the name of Yosef Appleboum et al.

U.S. Appl. No. 16/633,860, filed Jan. 24, 2020 in the name of Yosef Appleboum et al.

Aug. 16, 2018 "Cisco Identity Services Engine;" pp. 1-9; https://www.cisco.com/c/en/us/products/security/identity-services-engine/index.html.

* cited by examiner

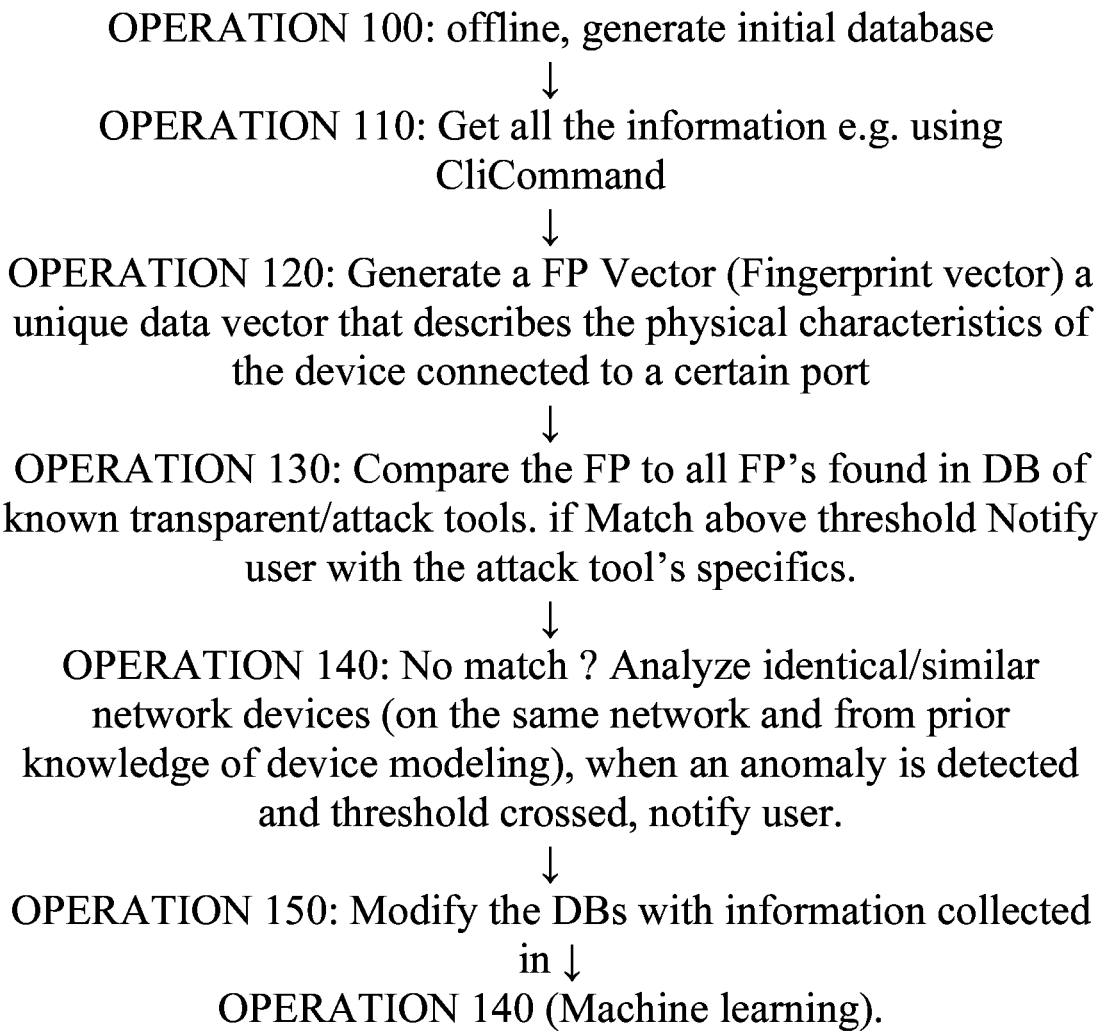

Fig. 1

OPERATION 100: offline, generate initial database
↓
OPERATION 110: Get all the information e.g. using CliCommand
↓
OPERATION 120: Generate a FP Vector (Fingerprint vector) a unique data vector that describes the physical characteristics of the device connected to a certain port
↓
OPERATION 130: Compare the FP to all FP's found in DB of known transparent/attack tools. if Match above threshold Notify user with the attack tool's specifics.
↓
OPERATION 140: No match ? Analyze identical/similar network devices (on the same network and from prior knowledge of device modeling), when an anomaly is detected and threshold crossed, notify user.
↓
OPERATION 150: Modify the DBs with information collected in ↓
OPERATION 140 (Machine learning).

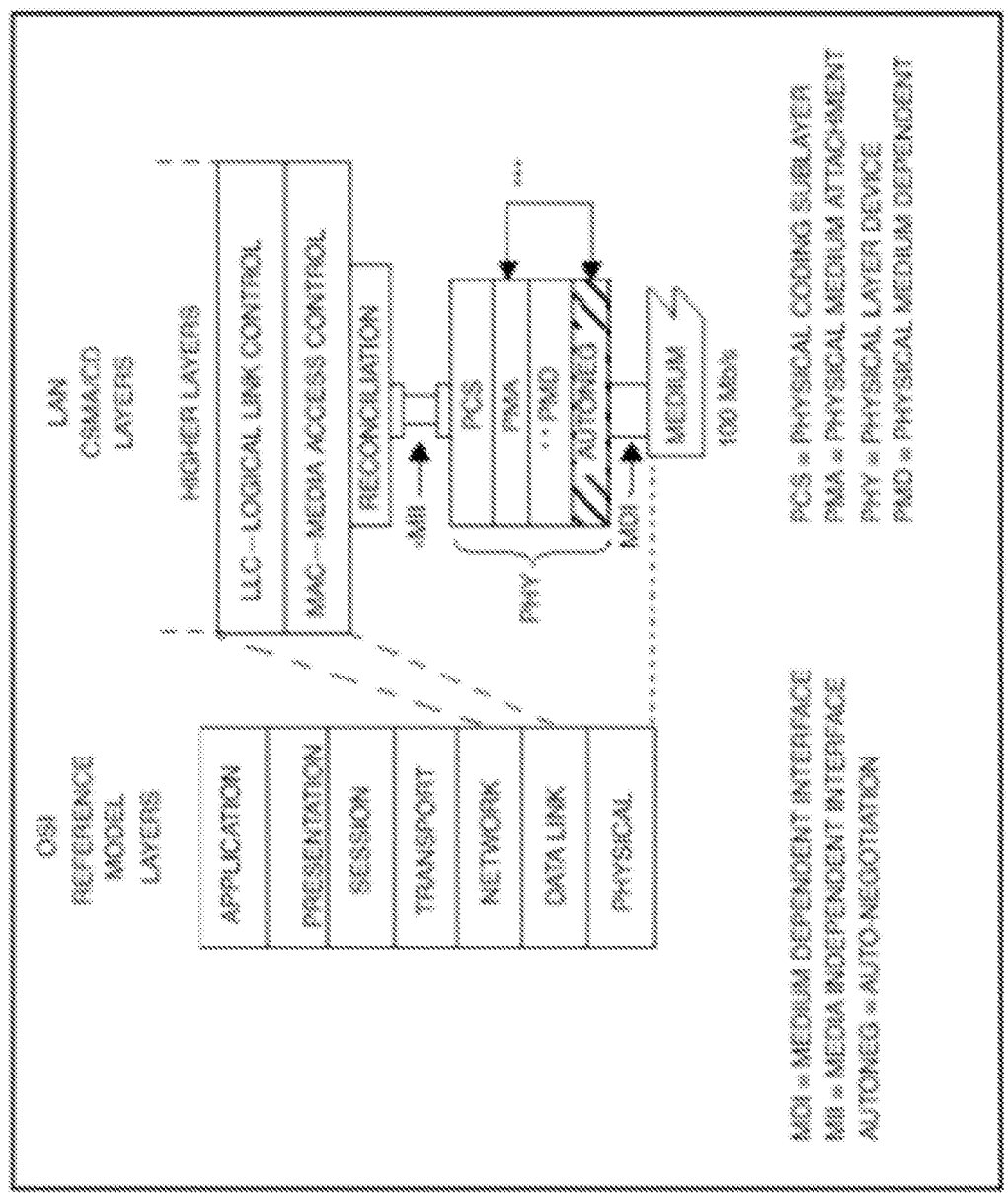

Fig. 4 a. For each model of a known malicious device collect physical-layer characteristics of that model's behavior when linked to that switch. Generate a fingerprint for that model by identifying physical-layer characteristics or patterns thereof, which are typical of that model and not of any other model.

↓ b. a DB of fingerprints is created; each model's fingerprint, aka signature, is stored.

↓ c. anomaly detection may be used e.g. to fuse all the PHY level data about the links and then determine that a malicious device has been deployed along link x.

↓ e. identify each link L in the network, whose PHY-layer characteristics match x, one of the malicious models, and then send an alert that a malicious device of model x has been identified at link L between switch S and networked device D in the organization's network.

↓ f. analyze physical-layer characteristics of each link L' whose PHY-layer characteristics do not match any of the known and stored malicious device model fingerprints

↓ g. machine learning to improve fingerprint-matching and/or anomaly detection in operation (f).

| | |
|---|---|
| Request | GET https://192.168.75.12/prime/api/switchlist/ |
| Response | { [<br>"IpAddress":"192.168.100.23",<br>"Priority": "1",<br>"Transport":"Telnet",<br>"Username":"User1",<br>"Password":"Password1",<br>"Enable":"EnablePassword"<br>],<br>[<br>"IpAddress":"192.168.100.24",<br>"Priority": "1",<br>"Transport":"Telnet",<br>"Username":"User1",<br>"Password":null,<br>"Enable":"EnablePass"<br>],<br>[<br>"IpAddress":"192.168.100.39",<br>"Priority": "3",<br>"Transport":"SSH",<br>"Username":"User2",<br>"Password":"Password2",<br>"Enable":"EnablePW2"<br>],<br>[<br>"IpAddress":"192.168.100.51",<br>"Priority": "1",<br>"Transport":"Telnet",<br>"Username":"User3",<br>"Password":"Pass3",<br>"Enable":null<br>],<br>[<br>"IpAddress":"192.168.100.72",<br>"Priority": "4",<br>"Transport":"Telnet",<br>"Username":null,<br>"Password":"Password",<br>"Enable":"EnablePass"<br>] } |

| Syslog Priority | Informational (6) |
|---|---|
| CEF Signature ID | 0x200001 |
| CEF Severity | 1 |
| Free Text / Name | New switch added |
| Extensions | dvc="208.32.80.36" |
| Syslog Example | *<86>New switch added, dvc=208.32.80.3 6* |
| CEF Example | *CEF:0lSepioSystemslSepioPrimel2.1.9.0l 0x200001lNew switch addedl1l dvc=208.32.80.3 6* |

Fig. 12b

| Syslog Priority | Notice (5) |
|---|---|
| CEF Signature ID | 0x200002 |
| CEF Severity | 1 |
| Free Text / Name | Successfully connected to a switch |
| Extensions | dvc="208.32.80.36" shost="Cisco-3750G-1" |
| Syslog Example | *<85>Successfully connected to a switch, dvc=208.32.80.3 6 shost=Cisco-3750G-1* |
| CEF Example | *CEF:0lSepioSystemslSepioPrimel2.1.9.0l 0x200002lSuccessfully connected to a switchl1ldvc=208.32.80.36 shost=Cisco- 3750G-1* |

Fig. 12c

| Syslog Priority | Warning (4) |
|---|---|
| CEF Signature ID | 0x200003 |
| CEF Severity | 5 |
| Free Text / Name | Unable to connect to a switch |
| Extensions | dvc="208.32.80.36" msg="Invalid login" |
| Syslog Example | *<84>Unable to connect to a switch, dvc=208.32.80.3 6 msg=Invalid login* |
| CEF Example | *CEF:0\|SepioSystems\|SepioPrime\|2.1.9.0\| 0x200003^nable to connect to a switch \|5\|dvc=208.32.80.36 msg=Invalid login* |

Fig. 12d

| Syslog Priority | Warning (4) |
|---|---|
| CEF Signature ID | 0x200004 |
| CEF Severity | 5 |
| Free Text / Name | Switch disconnected |
| Extensions | dvc="208.32.80.36" shost="Cisco-3750G-1" |
| Syslog Example | *<84>Switch disconnected, dvc=208.32.80.36 shost=Cisco-3 750G-1* |
| CEF Example | *CEF:0\|SepioSystems\|SepioPrime\|2.1.9.0\| 0x200004^witch disconnected\|5\| dvc=208.32.80.3 6 shost=Cisco-3750G-1* |

Fig. 13a

| Syslog Priority | Critical (2) |
|---|---|
| CEF Signature ID | 0x210001 |
| CEF Severity | 6 |
| Free Text / Name | Ethernet port alert |
| Extensions | dvc="208.32.80.36" shost="Cisco-3750G-1" deviceInboundInterface="Gi2/0/3" msg="Rouge device detected - LattePanda [80]" |
| Syslog Example | *<82>Ethernet port alert, dvc=208.32.80.36 shost=Cisco-3 750G-1 deviceInboundInterface=Gi2/0/3 msg=Rouge device detected - LattePanda [80]* |
| CEF Example | *CEF:0\|SepioSystems\|SepioPrime\|2.1.9.0\| 0x200001^thernet port alert\|6\| dvc=208.32.80.3 6 shost=Cisco-3750G-1 deviceInboundInterface=Gi2/0/3 msg=Rouge device detected - LattePanda [80]* |

Fig. 13b

| Syslog Priority | Warning (4) |
|---|---|
| CEF Signature ID | 0x210002 |
| CEF Severity | 5 |

| Free Text / Name | Ethernet port link down |
|---|---|
| Extensions | dvc="208.32.80.36" shost="Cisco-3750G-1" deviceInboundInterface="Gi2/0/3" |
| Syslog Example | *<84>Ethernet port link down, dvc=208.32.80.3 6 shost=Cisco-3750G-1 deviceInboundInterface=Gi2/0/3* |
| CEF Example | *CEF:0\|SepioSystems\|SepioPrime\|2.1.9.0\| 0x210002^thernet port link down \| 5 \| dvc=208.32.80.3 6 shost=Cisco-3750G-1 deviceInboundInterface=Gi2/0/3* |

Fig. 13c

| Syslog Priority | Warning (4) |
|---|---|
| CEF Signature ID | 0x210003 |
| CEF Severity | 5 |
| Free Text / Name | Ethernet port alert off |
| Extensions | dvc="208.32.80.36" shost="Cisco-3750G-1" deviceInboundInterface="Gi2/0/3" |
| Syslog Example | *<84>Ethernet port alert off, dvc=208.32.80.3 6 shost=Cisco-3750G-1 deviceInboundInterface=Gi2/0/3* |
| CEF Example | *CEF:0\|SepioSystems\|SepioPrime\|2.1.9.0\| 0x210003^thernet port alert off\| 5 \| dvc=208.32.80.3 6 shost=Cisco-3750G-1 deviceInboundInterface=Gi2/0/3* |

SYSTEM, METHOD, AND COMPUTER PROGRAM PRODUCT FOR SECURING A COMPUTER SYSTEM FROM THREATS INTRODUCED BY MALICIOUS TRANSPARENT NETWORK DEVICES

REFERENCE TO CO-PENDING APPLICATIONS

Priority is claimed from Israel patent application no. 254573 filed 18 Sep. 2017 and entitled " . . . For Securing a Local Area Network From threats introduced by Rogue or Malicious Devices", the disclosure of which application is hereby incorporated by reference.

FIELD OF THIS DISCLOSURE

The present invention relates generally to computerized networks such as LANs and more particularly to network security systems configured to secure computer networks such as LANs.

BACKGROUND FOR THIS DISCLOSURE

Large organizations aka enterprises may have large networks e.g. LANs with dozens, hundreds or even thousands or more of switches including, say, edge switches in each physical branch and core switches which serve as the networks backbone.

Enterprises e.g. banks may have an internal system e.g. SWIFT, over which large funds are transferred. This system typically has a network infrastructure connected to a switch of the bank (or other organization), typically highly secured, typically rj45-based rather than USB-based, which is separate from the bank's network infrastructure used for other purposes. An attack on the swift network may be effected e.g. by a person who is physically on the campus or premises (e.g. the protected IT premises) of the bank or other secured organization (aka internal abuser), who physically disconnects, say, a printer, and replaces the printer with malware or a malicious device. The attacker may, say, attack a camera so as to inject malicious video feed into the perimeter security system as part of a larger malicious scheme.

An enterprise can connect to SWIFT using one of three connectivity solutions or gateways:

SWIFT cloud connectivity, cloud-based connectivity using a SWIFT partner interface, or customer-hosted connectivity.

SWIFT cloud connectivity uses SWIFT's cloud-based connectivity solution, Alliance Lite2.

If Cloud-based connectivity using a SWIFT partner interface is desired, Alliance Lite2 for Business Applications (L2BA) is a cloud solution enabling the enterprise to combine its own software with SWIFT connectivity in a single package. L2BA is usable by various cloud-based applications, such as cash management solutions, treasury management systems, trade and security platforms, thus allowing enterprises to integrate Alliance Lite2 with their software and deliver multi-bank applications. Customer-hosted connectivity useful for customer-hosted infrastructure allows an enterprise to connect to SWIFT via Alliance Access or Alliance Gateway.

In Cisco switches, show commands are provided to find and diagnose switch malfunctions and to handle switch performance issues e.g. to determine why a particular link is performing poorly. Cisco's website states that "Cisco routers provide numerous integrated commands to assist you in monitoring and troubleshooting your internetwork . . . (including) show commands (which) help monitor installation behavior and normal network behavior, as well as isolate problem areas.

The show commands are powerful monitoring and troubleshooting tools. You can use the show commands to perform a variety of functions:

Monitor router behavior during initial installation
Monitor normal network operation
Isolate problem interfaces, nodes, media, or applications
Determine when a network is congested
Determine the status of servers, clients, or other neighbors
The following are some of the most commonly used show commands:

show version—Displays the configuration of the system hardware, the software version, the names and sources of configuration files, and the boot images.

show running-config—Displays the router configuration currently running.

show startup-config—Displays the router configuration stored in nonvolatile RAM (NVRAM).

show interfaces—Displays statistics for all interfaces configured on the router or access server. The resulting output varies, depending on the network for which an interface has been configured.

show controllers—Displays statistics for interface card controllers.

show flash—Displays the layout and contents of Flash memory.

show buffers—Displays statistics for the buffer pools on the router.

show memory summary—Displays memory pool statistics and summary information about the activities of the system memory allocator, and gives a block-by-block listing of memory use.

show process CPU—Displays information about the active processes on the router.

show stacks—Displays information about the stack utilization of processes and interrupt routines, as well as the reason for the last system reboot.

show CDP neighbors—Provides a degree of reachability information of directly connected Cisco devices. This is an extremely useful tool to determine the operational status of the physical and data link layer. Cisco Discovery Protocol (CDP) is a proprietary data link layer protocol.

show debugging—Displays information about the type of debugging that is enabled for your router.

( . . . ) Hundreds of other show commands are available. For details on using and interpreting the output of specific show commands, refer to the Cisco Internetwork Operating System (IOS) command references."

Anomaly detection is known, and is reviewed e.g. in https://en.wikipedia.org/wiki/Anomaly_detection;

Zimek, Arthur; Schubert, Erich (2017), "Outlier Detection", Encyclopedia of Database Systems, Springer New York, pp. 1-5, doi:10.1007/978-1-4899-7993-3_80719-1, ISBN 9781489979933, Hodge, V. J.; Austin, J. (2004). "A Survey of Outlier Detection Methodologies" (PDF). Artificial Intelligence Review. 22 (2): 85-126. CiteSeerX 10.1.1.318.4023 Freely accessible. doi:10.1007/s10462-004-4304-y; and Dokas, Paul; Ertoz, Levent; Kumar, Vipin; Lazarevic, Aleksandar; Srivastava, Jaideep; Tan, Pang-Ning (2002). "Data mining for network intrusion detection" (PDF). Proceedings NSF Workshop on Next Generation Data Mining. https://www.csee.umbc.edu/~kolari1/Mining/ngdm/dokas.pdf Known Datasets for Anomaly detection include: Anomaly detection benchmark data repository of the Ludwig-Maximilians-Universität München; Mirror at University of São Paulo; and ODDS-ODDS: publicly available outlier detection datasets with ground truth in different domains.

SMB is an example of a protocol which is widely used across organizations for file sharing purposes. An SMB Relay Attack relies on NTLM Version 2 authentication normally used in many organizations. When listening to what is going on in the network, an attacker e.g. hacker may capture a portion of the traffic related with the authentication and may relay this to other servers, all typically to authenticate as one of the users, and there may be no password needed. This allows an attacker with access to the network to get unauthorized access to the servers including e.g. capturing and then relaying traffic.

Enterprises are very wary of any equipment being plugged into their network, especially due to the increasing use of IoT devices that are connected to the network.

The 802.1x authentication protocol was proposed as a security scheme to address network connection security.

Conventional Network Access Control solutions include Cisco Identity Services Engine (ISE) and ForeScout CounterACT.

A system and method, using hardware, for protecting a computer system from USB related vulnerabilities, is described in co-pending WO2017158593A1, entitled "A System, Method and Computer Program Product for Protecting a Computer System From Attacks".

The Open Systems Interconnection model (OSI 7-layer model) is a conceptual model that characterizes and standardizes the communication functions of a telecommunication or computing system.

The physical layer is responsible for the transmission and reception of unstructured raw data between a device and a physical transmission medium. It converts the digital bits into electrical, radio, or optical signals. Layer specifications define characteristics such as voltage levels, the timing of voltage changes, physical data rates, maximum transmission distances, and physical connectors. This includes the layout of pins, voltages, line impedance, cable specifications, signal timing and frequency for wireless devices. Bit rate control is done at the physical layer and may define transmission mode as simplex, half duplex, and full duplex. The components of a physical layer can be described in terms of a network topology. Bluetooth, Ethernet, and USB all have specifications for a physical layer. Examples of physical layer characteristics include, say, operating voltage, standby current consumption, PoE parameters, and waveform equalizer coefficients.

Honeypots are an example of a conventional network security system which is described e.g. here: https://www.networkworld.com/article/3234692/lan-wan/increase-your-network-security-deploy-a-honeypot.htm. Honeypots act as a decoy to prevent intruders from accessing protected areas of a network. The honeypot lures potential hackers, does not contain live (true) data, may contain false data, information, shares features of the production system e.g. GUIs, login warning messages, and data fields. Intruder actions are monitored.

Generally, prior art LAN security solutions share the same problem—they examine network traffic and entities from their MAC layer, starting from layer 2 of the OSI layer model, hence potential attackers can manipulate or clone MAC layer information and defeat these solutions by "hiding" under the MAC layer. Examples of such prior art solutions are Cisco—https://www.cisco.com/c/en/us/products/security/identity-services-engine/index.html and ForeScout—https://www.forescout.com/solutions/network-access-control/.

References e.g. for texts in italics herein, are these:
http://searchnetworking.techtarget.com/definition/network-access-control
http://www.analog.com/media/en/technical-documentation/application-notes/EE-269.pdf
https://en.wikipedia.org/wiki/Autonegotiation
https://en.wikipedia.org/wiki/Media-independent_interface The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

Certain embodiments of the present invention seek to provide a system configured to secure a computer network from threats introduced by malicious transparent network devices and/or to discover ghost network devices, e.g. as described in any of the embodiments herein.

Certain embodiments of the present invention seek to provide a system configured to identify malicious transparent or MAC'less network devices within a computer network e.g. LAN, by monitoring OSI-model physical layer-level characteristics (such as: secure PHY) of links in the computer network or of linked pairs of devices in the computer network.

Certain embodiments seek to provide a system for detecting malware or a malicious device even if it resides in invisible aka transparent hardware devices e.g. devices which have no MAC identity, hence are invisible when the network is monitored by conventional network security systems.

Certain embodiments seek to provide a LAN security system to not merely allow greedy attackers to be detected, but also detect attackers which are active only infrequently e.g. by running the solution herein frequently or continuously or upon demand e.g. immediately.

Certain embodiments seek to provide alerts each time a new node enters a network e.g. local area network to be secured e.g. a local portion of the global SWIFT network. It is appreciated that a node added between an organization's switch and some other networked device of the organization may attack (say, for credential harvesting purposes) either the device or the switch itself.

Certain embodiments seek to provide a system aka solution which (typically continuously) monitors the network and looks for "Invisible" or transparent or "MACless" hardware devices, which are not picked up by conventional network security products. This is because conventional technology has visibility only from Layer 2 and above in the 7 layer OSI model where Layer 2 is the MAC layer, based on a MAC ID (e.g. 0a:b3:c5:7d:8e:5c) which is a unique identifier to every network (in contrast to the IP address e.g. 192.168.10.1 that may change between networks).

Certain embodiments of the present invention seek to provide circuitry typically comprising at least one processor in communication with at least one memory, with instructions stored in such memory executed by the processor to provide functionalities which are described herein in detail. Any functionality described herein may be firmware-implemented or processor-implemented as appropriate.

Thus, at least the following embodiments are provided:

Embodiment i

A system (or method or computer program product) for securing a local area network including identifying at least one transparent rogue device.

Note: the term "device" is intended to include any hardware device which may have been compromised, and is connected to a network such as a LAN hence may attack a device to be protected which is connected to the same network.

Embodiment ii

A system according to any preceding embodiment wherein said identifying relies at least partly on deep physical finger printing analysis.

Embodiment iii

A system according to any preceding embodiment wherein said identifying includes providing a port location for at least one transparent device.

Embodiment iv

A system according to any preceding embodiment wherein said identifying includes deriving at least one insight from an auto negotiation process.

Embodiment v

A system according to any preceding embodiment or embodiment iv wherein information about PHY parameters is gained through the MII register interface.

Embodiment vi

A system according to any preceding embodiment wherein said identifying includes comparing new PHY occurrences with known ones, including retrieving layer 1 profiling particulars regarding a given Ethernet device, from a database storing said particulars for each of a plurality of Ethernet devices.

Embodiment vii

A system according to any preceding embodiment wherein said identifying comprises outbound link detection.

Embodiment viii

A system according to any preceding embodiment wherein said outbound link detection includes giving a command that causes the remote side to turn off its port and monitoring to determine whether, following that command, the local port lost its link (suggesting no transparent device) or did not lose its link (suggesting existence of a transparent device), thereby to provide an indication for existence of a transparent device at the port in question.

Embodiment ix

A system according to any preceding embodiment wherein said outbound link detection comprises identifying transparent devices by subjecting same to higher level commands that cause the remote side to turn off its port since if the remote side is directly connected to the switch, the local port will lose its link, whereas if the port is connected through a transparent device, it will still hold the links.

Embodiment x

A system according to any preceding embodiment wherein said outbound link detection comprises an RF jamming transmission that will force a link disruption, causing the port to lose its connectivity, then monitoring ports and how fast they "bounce back" to full operation to differentiate which ports are likely to be wired directly vs ports which use a modem for their connections.

Embodiment xi

A secured PHY that will interconnect only with partnering PHYs that have the same level of layer 1 security and not with PHYs that do not have the same level of layer 1 security.

Embodiment xii

A method for providing a PHY, the method comprising: providing a secured PHY that will interconnect only with partnering PHYs that have the same level of layer 1 security and not with PHYs that do not have the same level of layer 1 security, the providing including embedding technology described herein at chip-level.

Embodiment xiii

Processing circuitry comprising at least one processor and at least one memory and configured to perform at least one of or any combination of the described operations or to execute any combination of the described modules.

It is appreciated that any reference herein to, or recitation of, an operation being performed is, e.g. if the operation is performed at least partly in software, intended to include both an embodiment where the operation is performed in its entirety by a server A, and also to include any type of "outsourcing" or "cloud" embodiments in which the operation, or portions thereof, is or are performed by a remote processor P (or several such), which may be deployed off-shore or "on a cloud", and an output of the operation is then communicated to, e.g. over a suitable computer network, and used by, server A. Analogously, the remote processor P may not, itself, perform all of the operations, and, instead, the remote processor P itself may receive output/s of portion/s of the operation from yet another processor/s P', may be deployed off-shore relative to P, or "on a cloud", and so forth.

The present invention also, thus, typically includes at least the following embodiments:

Embodiment 1

A network security system for detecting MAC'less/transparent devices, the system comprising:
  a data repository aka DB, operative to accumulate "fingerprint" data indicative of expected physical level characteristics for each of plural types of switch-device links (aka link types) interconnecting a switch and a hardware device, wherein at least one pair of links (i.e. at least 2 instances of links) of different types differ from one another at least with respect to the chipset residing in the respective device connected to the respective switch by each respective link;

apparatus for reading physical level characteristics of links in at least one network to be protected; and an output device configured to generate alerts of possible presence of a transparent device along at least one link if the physical level characteristics of the at least one link, as read by the apparatus, is anomalous relative to the "fingerprint" data stored in the data repository.

Embodiment 2

A system according to any preceding embodiment wherein the apparatus for reading physical level characteristics comprises a controller which issues to switches, commands which cause the switches to read the physical level characteristics of at least one link and to convey the physical level characteristics of the at least one link, as read, to the controller.

Embodiment 3

A system according to any preceding embodiment wherein the commands comprise at least one Cisco "show" command.

Embodiment 4

A system according to any preceding embodiment wherein the data repository includes physical layer characteristics based on physical layer-level data stored in at least one PHY register.

Embodiment 5

A system according to any preceding embodiment and also comprising machine learning functionality configured to update "fingerprint" data based on data, provided by at least one enterprise, indicating which alerts were false alarms.

Embodiment 6

A system according to any preceding embodiment wherein the apparatus for reading is operative to read physical level characteristics of links in each of plural networks to be protected in plural enterprises and the output device configured to generate alerts to each of the plural enterprises.

Embodiment 7

A system according to any preceding embodiment wherein at least one fingerprint in the data repository is used to identify anomalous physical level characteristics in plural enterprises' networks.

Embodiment 8

A system according to any preceding embodiment wherein the commands comprise the "show controllers Ethernet-controller" command inter alia.

Embodiment 9

A system according to any preceding embodiment wherein the "show controllers Ethernet-controller" command is given at least once, by the apparatus for reading, with a PHY keyword.

Embodiment 10

A system according to any preceding embodiment wherein the commands comprise a command which induces at least one switch to present, to the system, contents of interface internal registers.

Embodiment 11

A system according to any preceding embodiment wherein the commands comprise a command which induces at least one switch to provide, to the system, status of internal registers on at least one switch physical layer device (PHY) for at least one of the device or an interface to the device.

Embodiment 12

A system according to any preceding embodiment wherein the commands comprise a command which induces at least one switch to display per-interface send and receive statistics read from hardware.

Embodiment 13

A system according to any preceding embodiment wherein the expected physical level characteristics comprise at least one of PHY registers settings, timing parameters, and PoE information.

Power over Ethernet (PoE) is a technology for wired Ethernet local area networks (LANs) that allows the electrical current necessary for the operation of each device e.g. networked device, endpoint, to be carried by data cables rather than by power cords.

The original IEEE 802.3af-2003[1] PoE standard provides up to 15.4 W of DC power. The IEEE 802.3bu[10] amendment introduced PoDL which defines 10 power classes, ranging from 0.5 to 50 W (at PD).

When this technology is used, each device connected to a particular port has its own pattern of analog power consumption which pattern changes if another device is suddenly connected, perhaps by an attacker, to that port.

Therefore, if the switch is commanded to provide data regarding analog power consumption, a change in that data relative to analog power consumption data collected in the past at the same port, may indicate that a new device has been connected.

Also provided, excluding signals, is a computer program comprising computer program code means for performing any of the methods shown and described herein when said program is run on at least one computer; and a computer program product, comprising a typically non-transitory computer-usable or -readable medium e.g. non-transitory computer-usable or -readable storage medium, typically tangible, having a computer readable program code embodied therein, said computer readable program code adapted to be executed to implement any or all of the methods shown and described herein. The operations in accordance with the teachings herein may be performed by at least one computer specially constructed for the desired purposes or a general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules shown and described herein may include any one or combination or plurality of: a server, a data processor, a memory/computer storage, a communication interface, and a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. Use of nouns in singular form is not intended to be limiting; thus the term processor is intended to include a plurality of processing units which may be distributed or remote, the term server is intended to include plural typically interconnected modules running on plural respective servers, and so forth.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless stated otherwise, terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining", "providing", "accessing", "setting" or the like, refer to the action and/or processes of at least one computer/s or computing system/s, or processor/s or similar electronic computing device/s or circuitry, that manipulate and/or transform data which may be represented as physical, such as electronic, quantities e.g. within the computing system's registers and/or memories, and/or may be provided on-the-fly, into other data which may be similarly represented as physical quantities within the computing system's memories, registers or other such information storage, transmission or display devices, or may be provided to external factors e.g. via a suitable data network. The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices. Any reference to a computer, controller or processor is intended to include one or more hardware devices e.g. chips, which may be co-located or remote from one another. Any controller or processor may for example comprise at least one CPU, DSP, FPGA or ASIC, suitably configured in accordance with the logic and functionalities described herein.

The present invention may be described, merely for clarity, in terms of terminology specific to, or references to, particular programming languages, operating systems, browsers, system versions, individual products, protocols and the like. It will be appreciated that this terminology or such reference/s is intended to convey general principles of operation clearly and briefly, by way of example, and is not intended to limit the scope of the invention solely to a particular programming language, operating system, browser, system version, or individual product or protocol. Nonetheless, the disclosure of the standard or other professional literature defining the programming language, operating system, browser, system version, or individual product or protocol in question, is incorporated by reference herein in its entirety.

Elements separately listed herein need not be distinct components, and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein and/or to perform functionalities described herein and/or to implement any engine, interface or other system described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

FIG. 1 aka flow1, is a simplified flowchart illustration of a method provided in accordance with a first embodiment.

FIG. 2 is a Zoom in on the PHY layer e.g. as known in the art (prior art).

FIG. 4 aka flow2, is a simplified flowchart illustration of a method provided in accordance with a second embodiment. According to certain embodiments, all operations in FIG. 4 (and similarly for FIG. 1) are performed for each e.g. on premises of each enterprise e.g. when the system is in off-line on-premise mode with no external connection; optionally all or any suitable subset of the operations of FIG. 4 (or FIG. 1, or mix-and-match) may (also) be run centrally, at a central server serving plural enterprises.

FIG. 11 illustrates an example of Get Switch List format useful in certain embodiments. Examples of Network Security Messages (aka alerts), all or any subset of which may be provided, are shown in table form in FIGS. 12a-12d (for switches) and in FIGS. 13a-13c (for ports).

Figure 3:
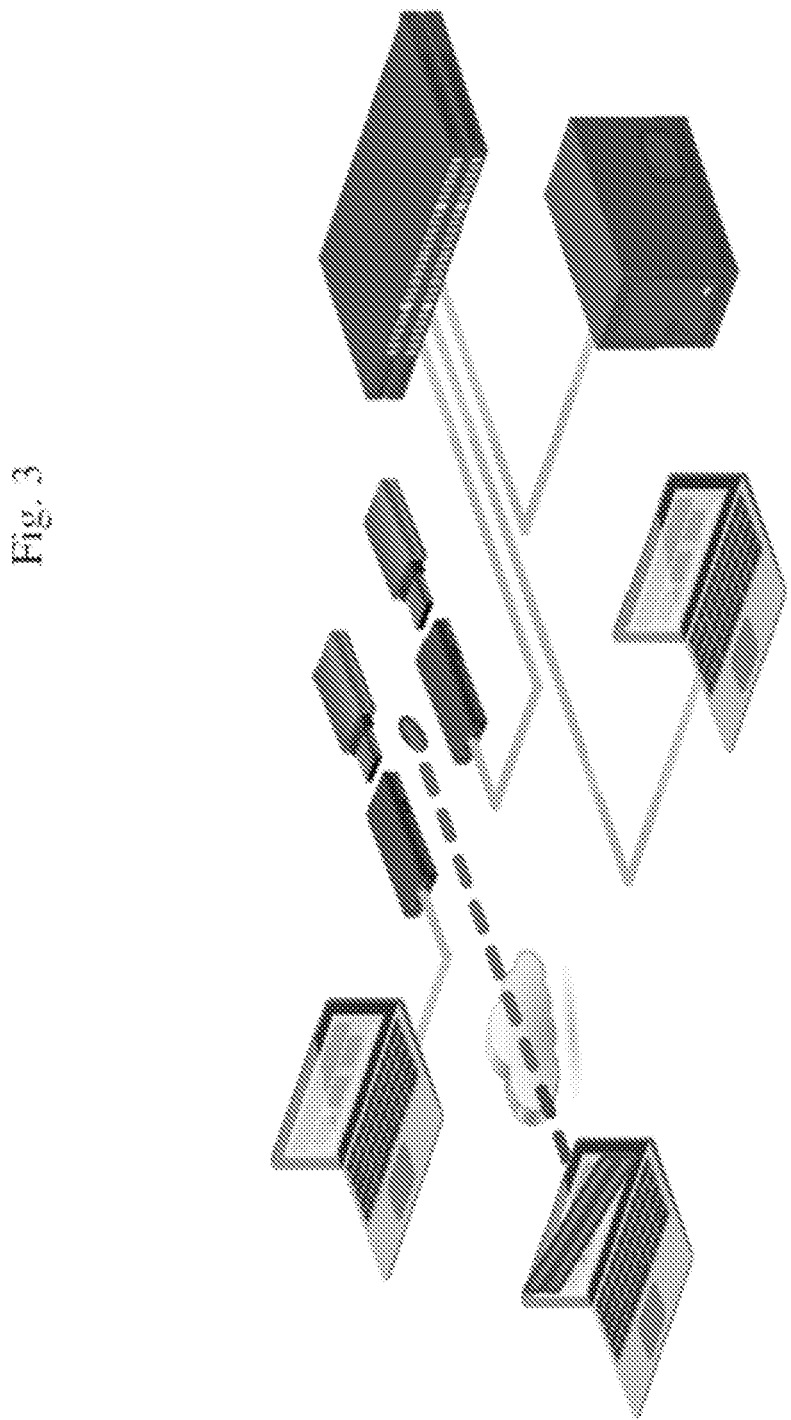
FIG. 3 is an attack scenario illustration using a VCM devices.

The above-illustrated embodiments may be provided separately or in any suitable combination and may be combined with all or any subset of the functionalities, operations, components and elements described herein.

For each illustrated table, all or any subset of the rows and columns may be provided.

Methods and systems included in the scope of the present invention may include some (e.g. any suitable subset) or all of the functional blocks shown in the specifically illustrated implementations by way of example, in any suitable order e.g. as shown.

Computational, functional or logical components described and illustrated herein can be implemented in various forms, for example, as hardware circuits such as but not limited to custom VLSI circuits or gate arrays or programmable hardware devices, such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Each functionality or method herein may be implemented in software (e.g. for execution on suitable processing hardware such as a microprocessor or digital signal processor), firmware, hardware (using any conventional hardware technology such as Integrated Circuit technology) or any combination thereof.

Functionality or operations stipulated as being software-implemented may alternatively be wholly or fully implemented by an equivalent hardware or firmware module and vice-versa. Firmware implementing functionality described herein, if provided, may be held in any suitable memory device and a suitable processing unit (aka processor) may be configured for executing firmware code. Alternatively, certain embodiments described herein may be implemented partly or exclusively in hardware in which case some or all of the variables, parameters, and computations described herein may be in hardware.

Any module or functionality described herein may comprise a suitably configured hardware component or circuitry. Alternatively or in addition, modules or functionality described herein may be performed by a general purpose computer or more generally by a suitable microprocessor, configured in accordance with methods shown and described herein, or any suitable subset, in any suitable order, of the operations included in such methods, or in accordance with methods known in the art.

Any logical functionality described herein may be implemented as a real time application, if and as appropriate, and which may employ any suitable architectural option, such as but not limited to FPGA, ASIC or DSP, or any suitable combination thereof.

Any hardware component mentioned herein may in fact include either one or more hardware devices e.g. chips, which may be co-located or remote from one another.

Any method described herein is intended to include within the scope of the embodiments of the present invention also any software or computer program performing some or all of the method's operations, including a mobile application, platform or operating system e.g. as stored in a medium, as well as combining the computer program with a hardware device to perform some or all of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line, which is of any type or level or amount or category of volatility, differentiation, mutability, accessibility, addressability, capacity, performance and energy use, and which is based on any suitable technologies such as semiconductor, magnetic, optical, paper and others.

DETAILED DESCRIPTION OF CERTAIN EMBODIMENTS

"LAN security is a major concern for any corporation or organization which possesses a Local Area Network. Corporate data, sensitive software, and personnel information are all accessible via the corporate network and must be protected from unauthorized intrusion and access.

The traditional approach to LAN security has focused on perimeter security—preventing outside intrusion into the corporate LAN via such solutions as firewalls, authentication mechanisms, etc."

The technology usually used for LAN security is mostly known as NAC (Network Access Controller) or NAS (Network Access Server).

"A traditional network access server (NAS) is a server that performs authentication and authorization functions for potential by users verifying logon information. In addition to these functions, NAC restricts the data that each particular user can access, as well as implementing anti-threat applications such as firewalls, antivirus software and spyware-detection programs. NAC also regulates and restricts the things individual subscribers can do once they are connected. Several major networking and IT vendors have introduced NAC products.

NAC is ideal for corporations and agencies where the user environment can be rigidly controlled. An example is a network for a large university with multiple departments, numerous access point s and thousands of users with various backgrounds and objectives."

Figure 5:
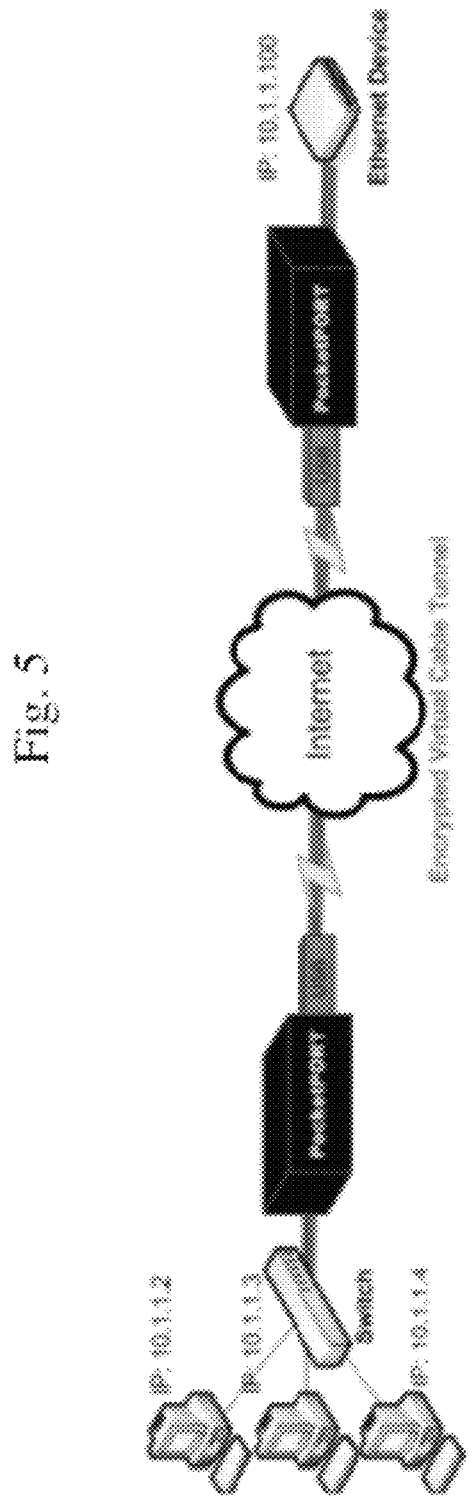
FIG. 5 is an example for the intended original use of the transparent devices.

All NAC and NAS share the same problem—they examine the network traffic and entities from their MAC layer, starting from layer 2 of the OSI layer model. Potential attackers can try to manipulate MAC layer information (for example—manipulating a MAC address to a one authenticated by the 802.1x protocol), but most NACs use advanced authentication schemes and machine learning that detect MAC address manipulations. Nevertheless there is still a significant segment of the network structure that is not probed—the physical layer, layer 1 of the OSI layer model. As attackers are aware of this fact, they try to find alternative paths to the organization's asset by inserting active devices (inline to the targeted device that was originally physically connected to the switch as shown in FIG. 3) that are "Transparent"— meaning they go undetected by existing monitoring, probing and intrusion detection tools. They are connected "In-line" through a legitimate LAN connection but cannot be identified or detected, as their effect may be compared to that of adding a new passive copper cable. Attackers actually make use of existing technology, as provided by companies like Proxicast. The original purpose of devices like the PoketPort 2 (other examples are various Raspberry Pi variants, Mikro Tik(mAP), Pwnie Express (Pwn Pro) GLI net (GL-MiFi) etc.) was to provide an easy way of connecting remote sites without the tedious network configuration associated with it. All the user has to do is to connect a cellular USB net stick with basic configuration. All traffic running through this "virtual cable" will be re-routed through an Internet switchboard (managed in this case by Proxicast). Attackers can take these devices and create their own switchboard (as this is a simple socket based communication scheme). He may then simply insert the devices into the organization's network—the attacker may choose any location within the network to deploy these tools, preferably as covertly as possible. An illustration of such a deployment is illustrated in FIG. 5.

A system, method and computer program product for securing a local area network from threats introduced by rogue or malicious devices, all according to certain embodiments, are now described.

Figure 6:
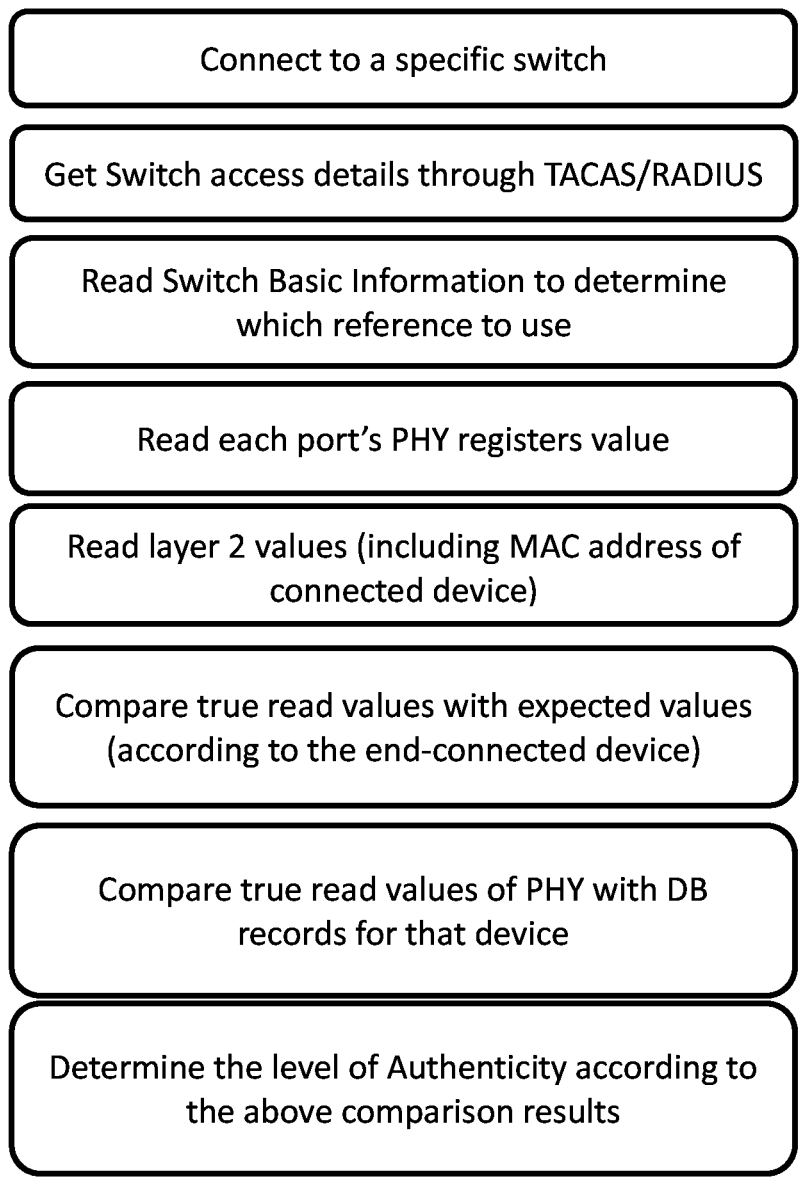
FIG. 6 is an example flow for deep physical finger printing analysis.

For example, certain embodiments of the invention provide successful identification of those "transparent devices" by deep physical finger printing analysis as described in FIG. 6. The term physical is applied because the analysis looks into layer 1 parameters, and deep signifies very specific details and parameters of this network connection. The term fingerprinting is used due to the fact that the combined physical specifics are unique and can be used as an identifiers similar to human fingerprints, where the system of the present invention may determine the existence and exact port location of a specific "transparent device". Once a specific port has been identified as having a transparent device, there are several options—first, notify the customers SIEM (Security and Information Events Management) or the NAC (Network Access Controller) or isolate the port independently. The common procedure is to move the suspected port to an isolated VLAN for further investigation. The third option would be less common, as customers prefer that their ports are not managed by two entities (NAC and the proposed solution) in parallel. Interface protocols between the proposed solution and the NAC/SIEM would usually be RESTful API, SYSLOG and SNMP.

Typically, the detection algorithm relies on at least one insight gained from an auto negotiation process.

Auto-negotiation may include any procedure by which two connected hardware devices share their capabilities regarding transmission parameter/s they have in common; the connected devices then choose a transmission mode they both support e.g. the highest performance transmission mode they both support.

"Auto-negotiation is an Ethernet procedure by which two connected devices choose common transmission parameters, such as speed, duplex mode, and flow control. In this process, the connected devices first share their capabilities regarding these parameters and then choose the highest performance transmission mode they both support. In the OSI model, auto-negotiation resides in the physical layer. For Ethernet over twisted pair it is defined in clause 28 of IEEE 802.3. Auto-negotiation was originally defined as an optional component in the Fast Ethernet standard. It is backwards compatible with the normal link pulses used by 10BASE-T. The protocol was significantly extended in the gigabit Ethernet standard, and is mandatory for 1000BASE-T gigabit Ethernet over twisted pair."

One can gain information about the various parameters of the PHY through the MII register interface. For example, "The media-independent interface (MII) was originally defined as a standard interface to connect a Fast Ethernet (i.e., 100 Mbit/s) media access control (MAC) block to a PHY chip. The MII is standardized by IEEE 802.3u and connects different types of PHYs to MACs. Being media independent means that different types of PHY devices for connecting to different media (i.e. Twisted pair copper, fiber optic, etc.) can be used without redesigning or replacing the MAC hardware. Thus any MAC may be used with any PHY, independent of the network signal transmission media.

The MII can be used to connect a MAC to an external PHY using a pluggable connector, or directly to a PHY chip which is on the same PCB. On a PC the CNR connector Type B carries MII bus interface signals.

The Management Data Input/Output (MDIO) serial bus is a subset of the MII that is used to transfer management information between MAC and PHY. At powerup, using auto-negotiation, the PHY usually adapts to whatever it is connected to unless settings are altered via the MDIO interface."

An example would be the information carried in the link advertisement register which indicates the capabilities of the remote PHY link partner. In the attack scenario discussed in this application, the transparent device has a different set of capabilities that differ from that of the PC or printer which are actually connected at the "end of the line".

Deep Finger Printing (DFP)

DFP is a process operative to characterize a complete set of parameters describing a given device's layer 1 behavior e.g. using operation/s shown in the flow described in FIG. 6. The detection algorithm typically starts out with analog parameters which are most difficult for a potential attacker to duplicate—as they are derived from the specific communication channel characteristics, they manifest in the form of specific equalizer coefficients which are used for channel waveform corrections.

Other analog parameters may include impedance and/or termination values in Ethernet transformers which are part of the PHY in most cases and typically can be measured only at this level.

Timing response parameters are also used for specific device identification, in a similar manner used by switch vendors where cable diagnostics functionality is embedded in their management interface.

One of the familiar terms is called TDR (Time Domain Reflectometer) as in the example described in the following link—
https://community.spiceworks.com/how_to/24277-using-cisco-cable-diagnostics In addition, information that is advertised by the link partners (the remote side connection with respect to the switch local port connection), known as advertisement registers, can also be used to identify a specific PHY in a given link.

http://www.microchip.com/forums/m979258.aspx

The specific settings configuration through the auto-negotiation process between the switch port and the transparent device which is connected directly to it, are dependent on the two link partners—each pair can generate a different settings or behavior—this is why the two "ends" of the connection need to be monitored (not only the local PHY, but the remote PHY as well).

Figure 8:
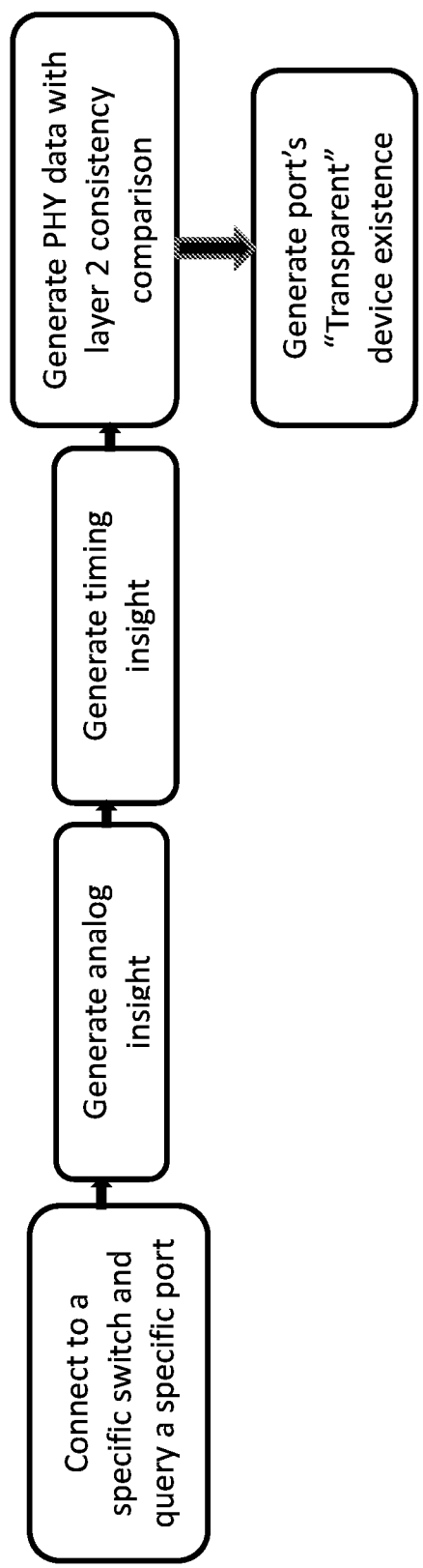
FIG. 8 is a flow of aggregated insight resulting in a detection indication.

In order to lower possible false positive indications, an additional layer of screening may be applied as part of the analysis process (as illustrated in FIG. 6 and FIG. 8)—by using additional layer 2 data this layer typically cross-correlates the layer 1 information with layer 2 (and above) information. The MAC address, IP, QoS, TTL and other parameters can be obtained by network traffic sniffing, and correlated with the layer 1 extracted data (as an example—the MAC address extracted from layer 2 monitoring identifies the device to be of specific vendor and type, data that can be compare with the ACTUAL behavior and advertisement data that is extracted through the remote PHY querying. As the transparent device does not change the layer 2 information (for example the MAC address), the expected device should behave like a 10 Gb NIC of an IBM server while the registers (read from the transparent device) indicate a different setup as they are set by the transparent device's capabilities. Thus, a true distinction is achieved between a true "transparent mode device" and an existing legitimate device that merely had some of its configuration altered. Alternatively or in addition, some transparent devices use networking chips (IC) that are of lower grade of performance Some can only process packets of certain types and structure, while dropping unsupported ones. An example is illustrated in BCM5718 Programmers Guide, FIG. 57 page 267. https://docs.broadcom.com/docs/1211168564147

The system may make use of this fact, by injecting specific packets to specific ports. The injection is carried out by a command from the application to the managed switch with the suspected port. The switch has the capability to send a specific packet pattern to a specific port. The result of such packet injection will be read out by the application and will be compared with the expected result. The system typically verifies that the injected packets have reached their destination—which may for example be determined by reading e.g. from the relevant counter register the likelihood of an intermediate networking IC being located in-line on a specific port connection.

The overall grade of risk per specific port/switch is determined by the server (application), based on several indications (some of them are threshold crossings and some specific values). The overall weights calculation in still not detailed at this stage.

Embedded Silicon Functionality

The technology described for establishing a secured layer 1 PHY connection herein can be embedded at chip-level (silicon level), thereby to provide a new generation of "Secured PHYs" that will interconnect only with partnering PHYs that have the same level of layer 1 security.

Once the security features are part of the networking IC (chip), this may be achieved by integrating this feature as part of the chip's VLSI design. A policy will be applied as part of the network buildup (but implemented at chip level) that devices will interconnect only when they can assure that their link's counterpart, which they are connected to, is verified, and considered to be safe. This is similar to the way where two terminals communicate only when they share the same level of security/encryption).

Reference Database

As more servers are deployed, an aggregated database of devices which includes the specific layer 1 profiling details of every Ethernet device is collected. This information is then used to cross-correlate and/or compare new PHY occurrences with known ones. Should it correlate, then it is marked it as having a high level of security compared with those which do not, which may be marked as "unknown" risk level. When the application logics correlate, a vector of parameters may be examined, to determine whether the overall relationship between the parameters are as in the "original" template that exists in the database. When doing such a comparison, the specific values are taken by themselves, followed by evaluation of the differences, thus providing an additional verification operation in approving and validating new Ethernet connections (as illustrated in the later stages in the flow described in FIG. 6).

Outbound Link Detection

As some of the transparent devices (such as PocketPort 2) require an outbound channel that will allow them to bypass monitored external links (i.e., through the enterprises' Internet connection)—some make use of a cellular net stick, a WiFi USB dongle, or any other proprietary communication equipment. As WiFi connections are easy to monitor, and have limited range, a potential attacker would prefer using a cellular connection.

In some sites, for example a highly confidential facility, it is unlikely that use of a cellular phone or modem is permitted, but if one is working for a pharmaceutical company, such use may be permitted. This policy dictates the feasibility of enforcing a no-wireless policy, turning, in the latter case, the surrounding wireless spectrum to a "jungle" of signals, where the detection of a specific cellular connection is almost impossible.

The proposed method may employ strong (value of jamming signal is determined on the specific dimension and construction material of the building and usually varies from 1 Watt to 100 Watts) RF jamming transmission in the following flow—the server will be connected to an external jamming unit that will transmit the jamming signal to its antenna covering a specific floor area). This will force an abrupt link disruption—the jamming pulse does not have to be a long one, and may be just long enough to cause the link to be dropped (1-2 sec.), causing the link to drop (if it is connected through a cellular connection). By monitoring the switches' links and how fast they "bounce back" to full operation, one can determine which ports are likely to be wired directly and which use a cellular/WiFi/other wireless modem for its connection, meaning if the link was established by direct wireline communication or a wireless one (assuming the case that the network owner is not using wireless extensions). Timing properties are used here as well, as the additional networking equipment delays the response time (when one ARP pings a port that is connected through a wireless extension, its response time to that ping will be greater compared with the case of being directly connected through a wired connection only).

Figure 9:
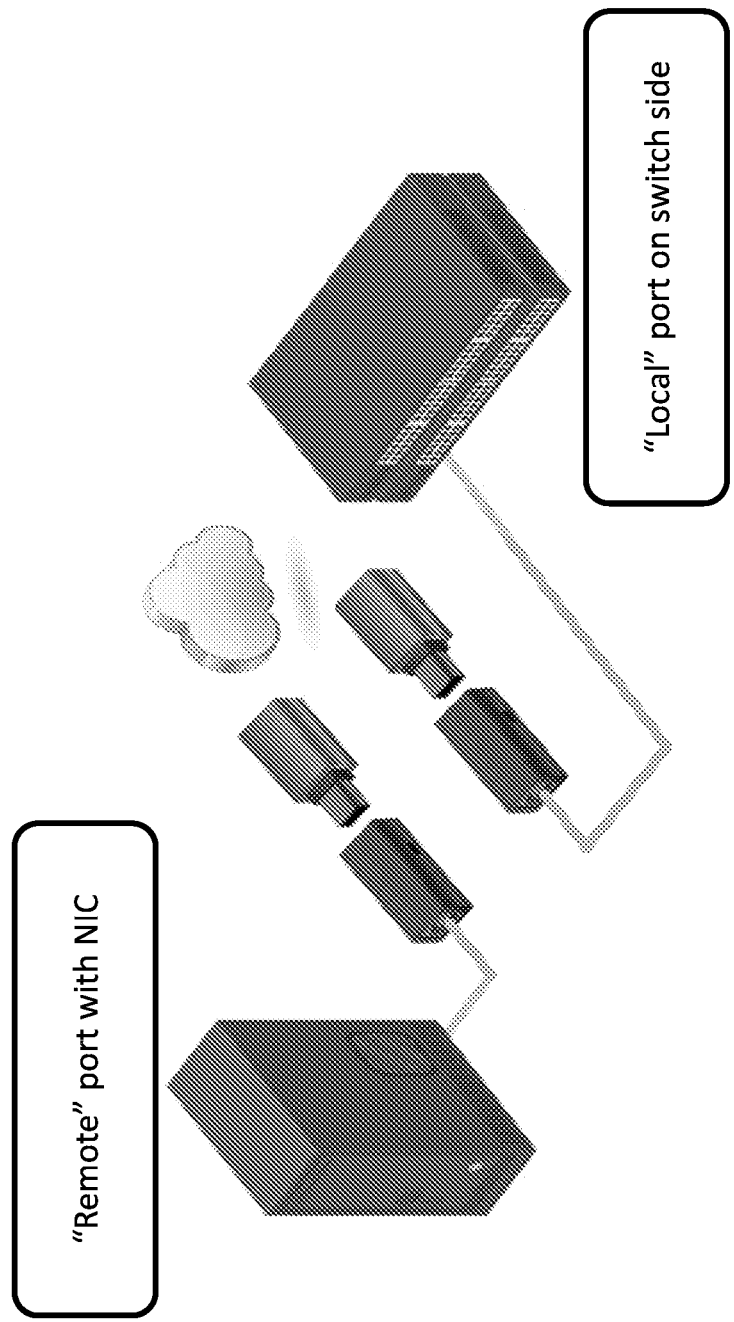
FIG. 9 is an example of the terms Remote and Local with respect to the switch.
Figure 10:
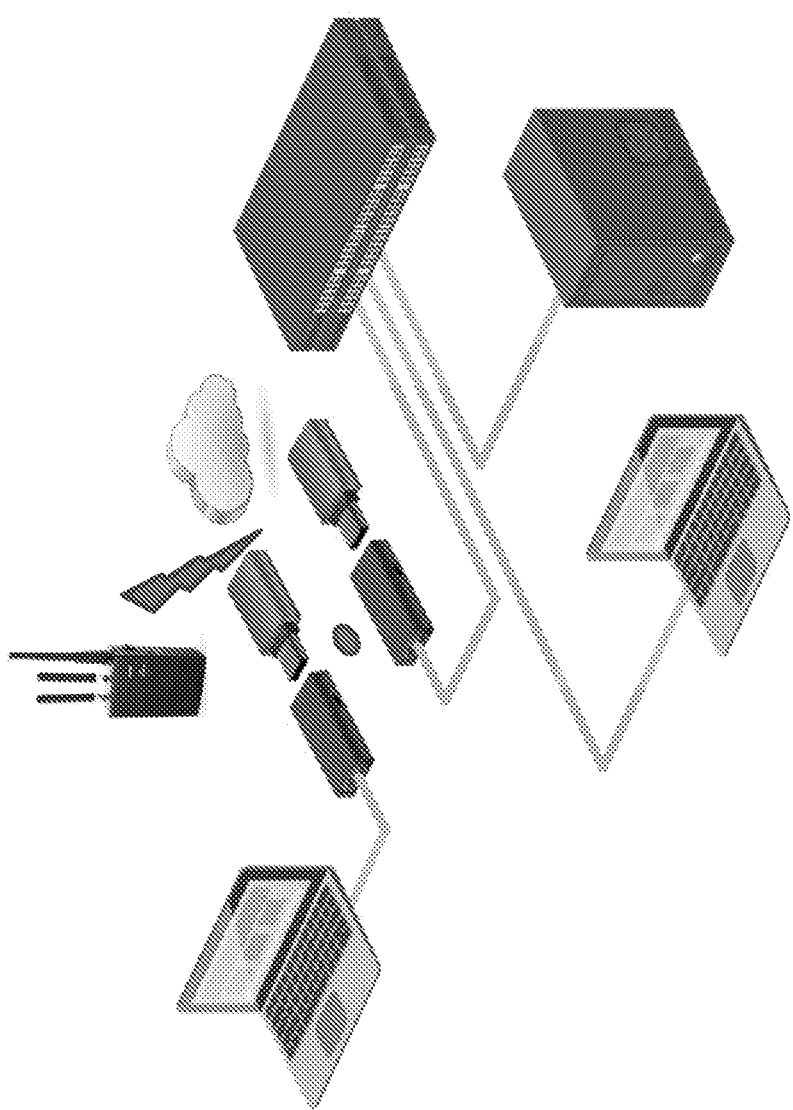
FIG. 10 is an image illustrating a jammer dropping the cellular connection used for the transparent device.

As illustrated in FIG. 10 the transparent device attack uses two devices that work in a "Virtual Cable Mode". When the wireless connection between the devices is disturbed, the Ethernet link will be disconnected until the internal wireless modems in the transparent device reconnects to the wireless network (which can be cellular based which will take more time, or a WiFi based network). Additional insight may be obtained by using higher level commands. All actions are carried out by this application, communicating with the end equipment. In most cases it would be the switching infrastructure, but could also be the end-point PC's as well (as in the NIC case described above) that cause the remote side (as described in FIG. 9) to turn off its port (momentarily NIC disable). Thus, if the remote side (the PC's NIC) is directly connected to the switch, the local port (the switches port) will lose its link, whereas if the remote port is connected through a transparent device, the local port will still hold the link Thus, giving a command that causes the remote side to turn off its port provides an (additional) indication for existence of a transparent device at the port in question: whether, following that command, the local port lost its link (suggesting no transparent device) or did not lose its link (suggesting existence of a transparent device).

Below is an example of data read from a switch through its management interface—the switch's vendor, model, configuration, and, more importantly, the MII registers (generated by the command "show controllers Ethernet-controller gigabitEthernet 1/0/1 PHY" which returns a list of all supported registers in a given port". This information is used as one of the data sources for the deep finger printing algorithm.

Example

Cisco WS-C3850-24T (MIPS) processor with 4194304K bytes of physical memory.
Processor board ID FOC2029U141
3 Virtual Ethernet interfaces
28 Gigabit Ethernet interfaces
4 Ten Gigabit Ethernet interfaces
2048K bytes of non-volatile configuration memory.
4194304K bytes of physical memory.
250456K bytes of Crash Files at crashinfo:.
1609272K bytes of Flash at flash:.
0K bytes of Dummy USB Flash at usbflash0:.
0K bytes of at webui:.

-continued

Base Ethernet MAC Address: d4:2c:44:62:29:80
Motherboard Assembly Number: 73-16297-05
Motherboard Serial Number: FOC20291LE7
Model Revision Number: AB0
Motherboard Revision Number: A0
Model Number: WS-C3850-24T
System Serial Number: FOC2029U141

| Switch | Ports | Model | SW Version | SW Image | Mode |
|---|---|---|---|---|---|
| * 1 | 32 | WS-C3850-24T | 03.07.04E | cat3k_caa-universalk9 | INSTALL |

Configuration register is 0x102
Switch#
Switch#
Switch#show controllers ethernet-controller gigabitEthernet 1/0/1 phy Gi1/0/1 (gpn: 1, port-number: 1)

| | | | |
|---|---|---|---|
| 0000 : 1140 | Control Register: | 0001 0001 0100 0000 |
| 0001 : 7949 | Control STATUS: | 0111 1001 0100 1001 |
| 0002 : 0141 | Phy ID 1: | 0000 0001 0100 0001 |
| 0003 : 0ED4 | Phy ID 2: | 0000 1110 1101 0100 |
| 0004 : 01E1 | Auto-Negotiation Advertisement: | 0000 0001 1110 0001 |
| 0005 : 0000 | Auto-Negotiation Link Partner: | 0000 0000 0000 0000 |
| 0006 : 0004 | Auto-Negotiation Expansion Reg: | 0000 0000 0000 0100 |
| 0007 : 2001 | Next Page Transmit Register: | 0010 0000 0000 0001 |
| 0008 : 0000 | Link Partner Next page Registe: | 0000 0000 0000 0000 |
| 0010 : 3870 | PHY Specific Control: | 0011 1000 0111 0000 |
| 0011 : 8000 | PHY Specific Status: | 1000 0000 0000 0000 |
| 0012 : 6400 | PHY Specific Interrupt Enable: | 0110 0100 0000 0000 |
| 0013 : 0040 | PHY Specific Interrupt Status: | 0000 0000 0100 0000 |

The solution as described herein may be implemented as illustrated in any of the drawings, e.g. as a standalone server appliance, or as a standalone application running on a designated or shared server (e.g. on a perimeter or a virtual machine).

The term "rogue" is intended to include a behavior e.g. malicious behavior of a device e.g. malicious networked device, which may be achieved by being transparent to monitoring tools.

References to LANs herein may alternatively be replaced by "WAN" or another networks, according to certain embodiments.

FIG. 1 is a flow for securing a LAN from threats, either on an on-going or continuous basis, or as an occasional or periodic scan. It is appreciated that following each alert or at least some alerts (e.g. those that are verified) generated by the system, the "offending" hardware device or malware which triggered the alert is typically physically found e.g. by manually following the switch-network device cable which triggered the alert, typically starting from the switch and proceeding along the cable (typically Standard RJ45 LAN Cable) toward the network device until the "offending" e.g. transparent device is found. The offending device, unless the alert is verified to have been a false alarm, may then be physically detached from the network. Verification of an alert may include ensuring that the alert did not occur as a result of a cabling issue According to certain embodiments, users can white-list specific devices that are possible malicious—for example, if a bank uses a Raspberry PI 3 device, as a network sniffer/honeypot, this may be initially picked up by the system—and later white listed by the user (administrator). Another false alarm, which typically is eliminated by verification (by not being verified, if indeed false) would be a server running with two NIC (Network Interface Card) one active, and the other in promiscuous mode, which would typically alert the system, as well.

The method of FIG. 1 may include all or any subset of operations 100, 110, ... below. It is appreciated, also, that operations of FIG. 4 may be mixed-and-matched with operations of the method of FIG. 1.

operation 100: offline, generate initial database (aka "SepioPrime DB") storing Fingerprint vectors of all known transparent/attack tools such as, say, 8.1 TP-Link Portable 3G/4G Router, 8.2 MikroTik mAP and 8.3 EDIMAX BR-6258n.

The DB typically includes physical layer characteristics for each specific device. The characteristics may for example be based on data stored in PHY registers because these registers describe various parameters in the physical layer, embedded as part of a dedicated PHY chip or a combined MAC+PHY chip.

Operation 110—All information from the PHY layer, regarding a given cable between a switch and a network device, is typically obtained (from switches in a given network e.g. LAN to be secured; e.g., for Cisco or cisco-like switches, using "show" commands), and may be compiled e.g. concatenated into a single FingerPrint vector. For example, 1140796D01410ED401E1C5E1000D6801400030003B706 C4A00000040 may be the finger print for hardware devices whose model number is MT300).

A particular advantage of certain embodiments is that there is no need to know the network topology once the ip address and user credentials (e.g. user name and password) are received by the system.

All or any subset of the following CLI commands may be used when communicating with the Cisco switches; it is appreciated that some commands may have more than one syntax i.e. the syntax differs between switch families and models, while other commands have a syntax which is uniform over all switch families and models, e.g. as indicated below:

show version
enable (as needed e.g. for user credentials. for example, sometimes the default login is for a privileged "enable" user in which case this information may be useful)
show module (used in modular systems. e.g. Catalyst 4500, 9400)
show module all (used in modular systems. e.g. Catalyst 4500)
show idprom supervisor (with or without additional parameters, model dependent)
show inventory chassis (some switch models e.g. the Catalyst 4500 have a chassis with multiple interface cards, in which case reading the inventory yields the configuration of the switch—number of ports etc.)
show interfaces status
show interface status (for some switch models, these commands show the specific details of every interface (port) connection)
show interfaces ... counters errors
show cdp neighbors (with or without 'detail' suffix)
show lldp neighbors
show eee
show inline power (with or without 'detail' suffix)
show power inline consumption
show idb
show mac address-table
show mac-address-table (typically, most or all switch models support this command, which includes a list of all the MAC IDs detected by the switch on a specific port. From the result of this query the system can tell, say, that there is a DELL Server NIC (network interface card) connected to specific port/s. this information may be cross-correlated with what is actually seen in the physical layer, for the link/s corresponding to those port/s, which enables the system to determine whether or not a links Physical layer behaves and operates as expected (e.g. has or does not have the physical characteristics of a link to a Dell Server NIC).

show controllers Ethernet-controller (typically with additional model dependent parameters). It is appreciated there are many different switch families aka series, and models within each series or family, e.g. Cisco's Catalyst 2960-L series is an example of a "family" aka series, and models within this family include C2960L-DNA-E-16, C2960L-DNA-E-16-3Y C2960L-DNA-E-16-5Y, etc.

show controllers Ethernet-controller ... phy (typically with additional model dependent parameters)

The Cisco literature says that the "show controllers Ethernet-controller" privileged EXEC command without keywords may be used "to display per-interface send and receive statistics read from the hardware. Use with the PHY keyword to display the interface internal registers". The Cisco literature says that in terms of syntax, the PHY keyword is what "provides the status of the internal registers on the switch physical layer device (PHY) for the device or the interface. This display includes the operational state of the automatic medium-dependent interface crossover (auto-MDIX) feature on an interface." The Cisco literature adds that conventionally, "when you enter the PHY or port-ASIC keywords, the displayed information is useful primarily for Cisco technical support representatives troubleshooting the switch." Note "interface" here refers to a link which connects a switch to a hw device in an enterprise network.

show platform software interface (typically with additional model dependent parameters)
show platform software interface ... mii (typically with additional model dependent parameters)
show platform hardware asicreg (typically with additional model dependent parameters)
bcm-shell module (typically with additional model dependent parameters)
according to some embodoiments, data or parameters regarding the pysical layer are collected (e.g., for cisco switches, via the show controllers ethernet-controller ... phy command) by reading (e.g. commanding the switch to read) the phy registers from the switch.

According to certain embodiments, some commands have more than one syntax because the syntax differs between switch families and models. Therefore, the system may include a separate "data retrieval" module for each system-supported switch and, typically, may suitably invoke the proper module for each encountered switch during operation (during a scan of an enterprise network). typically, by first reading the inventory and version of the switch, the system discerns the specific setup of the switch (e.g. number of ports, stacks). different switches may have the information accessible through different commands; thus for example, CISCO CATALYST 2960 has the information in a certain format and location while CISCO 3048 has that information through different commands.

According to certain embodiments, an alert may include a level of confidence which typically is dependent on the switch itself, as the results and data obtainable from different switch models may vary, one switch model being able to provide only a low level of data relative to other switch models which provide more detail; and the level of data provided then is used to quantify a level of confidence.

Some of the above commands (i.e., show inventory chassis) are inventory commands which, being inventory related, may be used for identifying the device in the network and its hardware and IOS version. This is useful to understand the number of ports etc. using pre-stored data indicating, say, that hardware device x, IOS version y has a certain number of ports. Other commands (i.e., show interface status) may be used, e.g. as described herein, for polling dynamic and low-level information.

Typically, all commands issued by the system to switches e.g. CLI commands are read-only, and the system typically never changes any setting or configuration from among a given switch's settings or configuration, and instead, the system only reads data from that switch.

Typically, no command involves monitoring, or access to traffic packets.

Typically, it is desired for the system to receive from the switches complete responses without terminal flow control, in which case the system may be assigned an authorization level sufficient to use the "terminal length 0" command. The system then typically issues this command automatically to a given switch, as soon as the system is connected to that switch.

Operation 120—Generate a FP Vector (Fingerprint vector) to describe the physical (in the sense of "physical layer") characteristics of the device connected to a certain port.

Each FP is a unique data vector i.e. 2 devices, even of the exact same manufacturer and model, will never have the exact same FP vector.

This operation may be performed for every new type of equipment being examined by the system. Typically, the system holds an FP (aka fingerprint) table for every MAC address seen by the system to be connected to the switch (since, typically, some FP bits are changed depending on the "counter setup" from the switch. For example, the physical layer may have one set of parameters when connected in a Giga-bit-Ethernet rate (1000 Mbs) compared with (another set of parameters when connected in) a Fast-Ethernet (100 Mbs) connection.

Additional attack-tool FPs may be generated, e.g. through the reverse-engineering phase of newly captured attack tools, or by running flows herein e.g. FIG. 1 or FIG. 4 on all or some previously unknown network element/s polled by the system herein.

Operation 120 generates actionable information (e.g. that described below) from the physical layer in the sense that once the system identifies that this is a transparent network device, the system takes action e.g. sends a request through suitable typically north-bound interfaces (e.g. through REST API, SYSLOG, SNMP Traps) to Isolate/Quarantine that specific port.

Alert information is typically sent to the northbound systems so they can isolate that specific port, and a separate VLAN is typically used for this.

A Cisco IOS command-line interface (CLI) is conventionally used for configuring software features on access point or bridge. At least some CLI "show" commands to command a Cisco switch to "show" certain characteristics of the physical layer which may then be used herein for network security (analogous commands exist for "CISCO like" and non-cisco switches). For example, show interfaces where interface is the term used for a connection to the switch, or show cdp neighbors which, for Cisco switches (analogous commands exist for "CISCO like" and non-cisco switches) shows which devices the switch thinks are connected to it (note CDP=Cisco Discovery Protocol).

Other shown commands may be used e.g. as described herein to instruct or command the switch to give to the system herein physical layer information which enables the system to understand which device/s are actually connected to the switch. FOR EXAMPLE—show cdp neighbors provides information about the connected devices to the switch; the system may cross correlate this information with what the system actually "sees" in the physical layer characteristics. for example, if the switch "thinks"/"sees" there is an hp printer connected (e.g. because the system sees a mac prefix of hp) but the physical layer parameters do not align with that, the system typically sends an alert to the user (enterprise).

Operation 130—Compare the FP to all FP's found in the database of known transparent/attack tools generated in operation 100 above (aka SepioPrime DB), e.g. by computing a match or distance "score" e.g. using KNN (Nearest Neighbors algorithm) to compare and group data sets).

Operation 135: if the Match is above threshold, notify the user with the attack tool's specifics e.g. what type of device (e.g. Vendor and P/N of the suspected tools(s)) the solution, aka system described herein, has determined that a given switch is connected to.

It is appreciated that as more instances of MAC-Switch parameters configuration-FP are accumulated e.g. in the system DBs, the system can even better "double check" findings, since the system continues accumulating plural occurrences of each specific device's behavior in different network conditions hence is able to more accurately detect anomalies which should trigger an alert, as opposed to mere artefacts of different network conditions.

Operation 140—if no match i.e. if the match is below threshold, the system typically analyzes identical/similar network devices (e.g. on the same network, and/or from prior knowledge of device modeling; when an anomaly is detected and threshold is crossed, notify the user. For example, prior knowledge of device modeling may be used as follows: the system analyzes and "fingerprints" all devices, and stores the fingerprints in a data repository; this becomes prior knowledge from that point onward. for example, once the system has modelled an NIC of a DELL Server, each time the system encounter s DELL server from that series and with that same (or similar) MAC preficx, the system typically expects that server to behave the same as the stored model or fingerprint, and if not, then the system typically generates an alert.

Typically, statistical identical/similar outputs are generated by quantifying how "different" the current FP of a device is from the FP's stored in the system DBs. If all previously stored occurrences of a certain attack tool perfectly match what the system is currently reading from the switch with regard to a specific port, that is awarded a higher score, compared to instances of an only partial alignment between DB and real time FPs, e.g. as discovered using conventional anomaly detection techniques.

Operation 150—Modify central or client DBs with information collected in operation 140 (Machine learning). Typically, as more servers are deployed, an aggregated database of devices (aka Reference Database_) which includes the specific layer 1 profiling details of every Ethernet device, is collected.

Typically, the system described herein has a central "brain" or server, and also plural "servers" or brains (which are clients of the brain) which are deployed in respective enterprises or organizations. Given each organization's approval, the system retrieves data accumulated at the "client-brains"; in most cases the clients run an offline on-premise deployment that is accessible by the central server only pending such approval.

The central "brain" benefits from the fact that it has a wider view and more instances of a given device (as an example—5 devices are encountered by the system in enterpriseA that all act in a certain way which is then defined as authentic. Now a single instance of that device is encountered in enterpriseB; the central brain, if it knows the 5 devices from enterpriseA, can more easily decide about the single occurrence in enterpriseB, and whether it should be defined as authentic, or it should be defined as justifying an alert.

It is appreciated that the flows herein are not limited in their applicability to Cisco switches, or to Cisco IOS version 12.2 and above or to Cisco version 03.04.01 and above (depending on the specific model). Instead, the flows herein may be used, mutatis mutandis, for non-Cisco switches as well, by simply replacing the "front-end" which reads raw-data from the switch, to adapt to the non-Cisco switch's particular commands and particular abilities to provide raw data regarding devices linked to the switch. The flow may, if needed, be adapted so its data needs correspond to the abilities of a particular switch to provide raw data regarding devices linked to the switch.

Any suitable technology may be employed to deploy the system e.g. application herein. For example, the system may be DOCKER based (the system may be deployed as a set of Docker containers (e.g. images) and a Volume for storing the persistent data—e.g. the system may be delivered in, say, 7 DOCKER images (depending on the specific system configuration) with sizes of, say, up to 350 MB each yielding a total size not higher than, say, 2 GB) since DOCKER allows applications to be deployed regardless of the OS used by the machine. All an end-user e.g. organization aka enterprise may need to do, is to setup a server e.g. as per the following setup operations, and then, import a list of switches in one of the options described below in the context of switch list management. Alternatively, if no DOCKER environment (say, version 17.09 or above) is available and in use in the organization, a standard OS may be used e.g. Ubunto Server 16.04 LTS; or the system may be deployed on RedHat Enterprise Linux version 7.3. If Linux is not possible, there is an option (to run on a Windows Server 2016 e.g. with Nested Virtualization enabled. Setup operations for deploying the Network Security system herein in an on-premise installation may, in certain use-cases or embodiments, assume the system is to be deployed on a single machine (centralized), may assume a single physical server or VM compatible with a given hardware specification, and may assume the current installation is designed to support a combination of up to 2,500 switches and 60,000 interfaces and up to 6,000 workstations and 75,000 peripheral devices. Data may be stored on the local filesystem (integrated PostgreSQL using local Volume). Optional database backup on an external system may be provided.

Any suitable switch list management options may be provided. For example, to facilitate updating the list of network switches, all or any subset of the following interfaces for managing the list may be provided:

File Export and Import: A simple text file in Comma Separated Values (CSV) format is supported for exporting and importing the list of switches. For keeping security strict, passwords and related information (e.g. the enable password when necessary) are typically omitted when exporting, yet are typically needed and expected in the file when importing.

REST API: An open format may be detailed for integrators wishing to provide an API for the system to read from. For example, see the Get Switch List format of FIG. 11.

File Export and Import operations may be available e.g. via a suitable navigation menu. Any suitable Exported File Format may be employed, such as the following example exported file:
Sepio Systems Switch List Export
Export Time: YYYY/MM/DD HH:MM:SS
User: Matthew Bailey

The order of fields (per switch) are:
IP Address, Priority, Transport, Username, Password, EnablePass
—Priority from 1 (Critical) through 3 (Normal) to 5 (Occasional)

192.168.100.23,1,Telnet,User1,X67FR@,
192.168.100.24,1,Telnet,User1,X67FR@,K4^7bG
192.168.100.39,3,SSH,User2,Pass75,myEnableSecret
192.168.100.51,1,Telnet,User3,
Any suitable imported File Format may be employed, such as the following example imported file:
Any comment here
Or here.
As long as they start with the '#' character

The order of fields (per switch) are:
IP Address, Priority, Transport, Username, Password, EnablePass
—Priority from 1 (Critical) through 3 (Normal) to 5 (Occasional)
—Username, Password, and EnablePass can be set or omitted

In the below example:
0.24 does not need a Password but does need an EnablePass
0.39 does need a user Password but does not need an EnablePass
0.72 does not need a Username but does need Password and EnablePass

192.168.100.23,1, Telnet, User1,Password1,EnablePassword
192.168.100.24,1,Telnet,User1,EnablePass
192.168.100.39,3,SSH,User2,Password2,EnablePW2
Comments are also possible throughout the file
192.168.100.23,SSH, User3
192.168.100.51,1,Telnet,User3,Pass3,
192.168.100.72,4,Telnet,Password,EnablePass When importing a switch list through a file, the administrator may be prompted to define whether the imported entries will replace the existing list of switches, or will be added to the existing list (meaning that switches that are defined in the system and do not appear in the list will remain after the import is completed). When importing an entry with IP address of an existing switch, the entry from the list typically replaces the existing one.

FIG. 4 is a network securing method according to certain embodiments. The method of FIG. 4 may include all or any subset of operations a, b, . . . below. It is appreciated, also, that operations of FIG. 4 may be mixed-and-matched with operations of the method of FIG. 1 e.g. any operation/s of FIG. 1 may be provided in combination with any operation/s of FIG. 4.

a. For each model of a known malicious device (malicious devices may have legitimate use cases, but also have malicious use-cases), connect an actual physical instance of that model to a switch e.g. a switch widely used by organizations' networks, and collect physical-layer characteristics of that model's behavior when linked to that switch, e.g. using Cisco show commands to command the switch (if Cisco or Cisco-like) to provide these characteristics, or using similar non-Cisco commands to command a non-Cisco, non-Cisco-like switch to provide these characteristics. Generate a fingerprint for that model by identifying physical-layer characteristics or patterns thereof, which are typical of that model and not of any other model.

b. Typically, a DB of fingerprints is created for every device connected—for known-to-be-possibly-malicious-devices and/or for any other type of network device; typically each model's fingerprint, aka signature, is stored. For example, one fingerprint may be stored for AR150 model hardware, another for LTE300n model hardware, etc. during a scan, PHY layer characteristics (e.g. collected using a "show" command to a Cisco switch or similar for a non-Cisco switch), regarding a switch's link1 to an instance of AR150 model hardware may be expected to be similar to the AR150 fingerprint, hence if the link's PHY layer characteristics collected during the scan differ (as determined e.g. by conventional anomaly detection) from the PHY layer characteristics of the AR50 fingerprint, an alarm regarding link1 may be generated. Similarly, during a scan, physical layer characteristics (e.g. collected using a "show" command to a cisco switch or similar for a non-cisco switch), regarding a switch's link to an instance of LTE300n model hardware may be expected to be similar to the stored LTE300n fingerprint, hence if the link's physical layer characteristics collected during the scan differ (as determined e.g. by conventional anomaly detection) from the physical layer characteristics of the LTE300n fingerprint, an alarm may be generated for that link2.

Regarding (typically offline) operations a, b, it is appreciated that fingerprints may be stored for each "link-type" where a separate link-type may be defined, not only for each model of malicious device, but also for each model of legitimate equipment (switch, networked device e.g. printer, camera etc.). Also, it is appreciated that fingerprints may be device-level fingerprints, stored for each link (or link-type) between a device of model MD and a switch of model MS, or for each link (or link-type) to a device of model MD (e.g. if it is known that the PHY-layer characteristics or fingerprint does not change much, regardless of which model of switch the device is linked to), or fingerprints may be chipset-level fingerprints, stored for each model of chipset (say: for the Intel LGA 2066 model chipset, and for the Intel 82943GML mobile chipset, etc.) included in the device at one end of the link (or link-type), or for each link between a device whose chipset is of model MC and a switch whose chipset is of model MC' (e.g. there may not be need for a separate fingerprint for Raspberry Pi 2 and 3 which both share the same SMSC LAN9514 chipset, e.g. if it is known that the PHY-layer characteristics or fingerprint does not change much regardless of which chipset resides in the switch the device is linked to). If fingerprints (or link-types) are chipset-level rather than device-level, then, typically, tables are stored indicating known chipset-device/switch model relationships e.g. which chipset-model resides within various device models (malware and transparent e.g. legitimate) and within various switch-models. Typically, information re the outer appearance of models is stored (e.g. color, size, image) e.g. to allow alerts to facilitate a search for the physical device by including appearance information in the alert e.g. "the device which triggered this alarm probably looks like this: (alert here includes image of outer appearance of device)".

Advantageously, the physical-layer characteristics or fingerprint of a link remain generally uniform, regardless of which firmware or software has been loaded onto a given hardware element of a given model. A further advantage is that many, if not most attacker devices, are formed of off-the-shelf hardware, which may have specially made malevolent firmware and/or software. A yet further advantage is that the number of models of off-the-shelf hardware elements with attack-tool potential being used by the public, including by hackers, is limited, perhaps only some dozens of models at any given time, with new models being put on the market from time to time.

c. anomaly detection may be used e.g. to fuse all the PHY level data about the links and then determine that a malicious device has been deployed along link x and to determine which malicious device it is.

The system typically looks out for specific attack tools "signatures" and, if such are detected, the system typically alerts the user immediately. If no specific attack tools "signature" is detected, the system may probe the entire physical-layer of the probed network. Typically, the DB holds a list of MAC IDs, and for each, the fingerprint that MAC ID created when connected to at least one, and typically various different, switches. Then, for example, the system may encounter one specific MAC ID with a specific chipset in a bank setup in Germany connected to a CISCO 2960 and a similar MAC ID in South Africa which is perhaps connected to the same CISCO 2960 or perhaps is connected to some other switch. When a new link is probed with a similar MAC ID, the system will compare that links physical layer characteristics with the one that is available in the DB from previous recordings DB and, depending on the level of similarity (high/low), declare whether that link is a possibly "suspected" port—yes/no. Anomaly detection may be used to identify whether a link is a possibly "suspected" port. Any suitable distance function may be used to quantify the level or degree of similarity such as, say, KNN.

d. scan the network including using Cisco show commands to command each network switch to present PHY-layer characteristics of each link between that switch and any other networked device that the switch is connected to via the link (another switch, computer, IP telephone, video camera, etc.)

e. identify each link L in the network, whose PHY-layer characteristics match x, one of the malicious models, and then send an alert that a malicious device of model x has been identified at link L between switch S and networked device D in the organization's network.

f. analyze physical-layer characteristics of each link L' whose PHY-layer characteristics do not match any of the known and stored malicious device model fingerprints. e.g. compare PHY-layer characteristics of each such link, which is believed to be a link device of model MD and switch of model MS, to expected PHY-layer characteristics e.g. PHY-layer characteristics known to be typical of links between a device of model MD and a switch of model MS interconnected by this link (known e.g. by fingerprinting, in advance, benign switches and other devices, rather than just malicious devices).

If, e.g. using conventional anomaly detection, the physical-layer characteristics reported by the switch responsive to Cisco show commands, are anomalous relative to the expected characteristics, send an alert, that a network implant aka malicious device whose model is unknown, has been identified at (e.g. along) link L'.

It is appreciated that, typically, the system receives, from each switch, the MACs of each of the devices allegedly connected to that switch.

g. machine learning to improve the fingerprint-matching in operation (e) and/or anomaly detection in operation (f). For example, the system may seek, receive and store data from IT personnel, as to whether a network implant aka malicious device, was indeed found at a certain link or not, and, if so, whether it was of model x (as predicted—if predicted) or not. These known instances may be used as input (test and validation sets) for machine learning (ML). It is appreciated that ML (say) may be used to fingerprint a new malicious device, without actually possessing and connecting a physical instance of that malicious device, by using offline data or data sheet documentation.

Typically, information re the outer appearance of models is stored (e.g. size and/or color and/or image of the model is stored), and is included in alerts, so as to facilitate finding, e.g. by visual inspection, of the physical device which triggered the link, along the link. For example, size and/or color and/or image may be helpful in finding a malicious device within rack/s on which dozens of devices may be delayed; if IT personnel know they are looking for a pocket-sized yellow device or cigarette-sized red box, this may facilitate the search. To give another example, when searching along the link, it is helpful to know whether the device is pocket-sized (too large to be hidden in braided cable so no need to search there) or whether the device is, say, finger-sized (small enough to be hidden in braided cable so there is a need to search there).

Typically, the switch supports TDR functionality as part of its diagnostics, typically showing cable lengths (e.g. based on signal reflection and timing measurements). While this information is dependent on cabling dielectric characteristics, information may be understood by comparing two or plural cables routed in a similar path.

Typically, the method herein is useful for detecting transparent devices in inline network devices operating in layer 1, whereas existing network security solutions are based on layer 2 or 3 information from the enterprise's network topology such as switches, firewalls, intrusion detection and intrusion prevention systems, web application firewalls, anti-malware and network taps, routers, which typically receive packets and forward them to their intended destination/s. Typically, the method herein is useful for detecting malicious device in networks connected inline to an external network, such as SWIFT.

It is appreciated that the methods of FIG. 1 or of FIG. 4 or any operation therewithin may be operated at any suitable frequency and/or time. For example, the method may be operated once on a given network, as a one-time survey, or may be operated on demand or periodically e.g. every quarter, or may be in continuous operation which is considered the best and most conservative practice.

It is appreciated that any suitable physical layer characteristics may be sampled by the method of FIG. 1 or of FIG. 4 e.g. timing or any other physical layer characteristic described herein or known in the art.

According to certain embodiments, the system does profiling (e.g. Of power parameters such as voltage, current, poe related parameters) and/or with a waveform and/or and/or with autonegotiation; this may be performed with reference to. Physical layer parameters/registers read from the switch.

Typically, device fingerprint/s is/are a compiled version of the profiles.

Many vendors manufacture switches, however, it is apparent that most switches in networked organizations are Cisco switches, or are at least Cisco-like, even if the manufacturer is not Cisco (is e.g. Arista, Juniper, Huawei, HPE, etc.). Entire organizations e.g. banks may use a network based on Cisco switches only.

For clarity, the embodiments described herein are described in Cisco or Cisco-like terms, however, alternatively, the methods and systems herein may be implemented on networks in which some or all switches are neither Cisco nor even Cisco-like. In particular, embodiments herein describe that PHY-level parameters e.g. characterizing links between network nodes, may be collected using Cisco "show" commands to the network switches.

However, alternatively, any switch, even if neither Cisco or Cisco-like, which understands commands which provide PHY-level parameters, may be used; applicability of the present invention is not limited to Cisco "show" commands specifically.

It is appreciated however that some Cisco "show" commands are so common as to be generic even across many, most, or all non-Cisco, but Cisco-like switches, whereas more "exotic" show commands may vary from vendor to vendor, such that embodiments particularly shown and described herein by way of example, may need to be tweaked.

Equalizers may be adaptive.

Equalizers can be used in preventative network maintenance. Each phy chip/s may hold/s a set of equalizer coefficients e.g. At the physical layer to better adjust the signal shaping to the specifics of the transport channel (the actual physical link).

It is appreciated that a switch may build a pattern of waveforms that differs between devices which may be used by the system to detect a malicious device connected, because the pattern would be different for a legitimate device that is connected (i.e., dell server nic) and that of what is read (e.g. Indicating a phy of raspberry pi 3 is present).

Any suitable anomaly detection may be used herein since the scope of the invention is not limited to a particular anomaly detection technology. Generally, anomaly detection as used herein is intended to include outlier detection and to include identification of observations differing significantly from other data e.g. previous data. In the context of network intrusion detection, the observations may be unexpected bursts in activity which need not adhere to the common statistical definition of an outlier as a rare object. A cluster analysis algorithm may be used to aggregate data e.g. before applying anomaly detection techniques. Anomaly detection for intrusion detection may be accomplished with thresholds and statistics, or with soft computing, and inductive learning. Types of statistics proposed in the literature have included profiles of users, workstations, networks, remote hosts, groups of users, and programs based on frequencies, means, variances, covariances, and standard deviations. In terms of software solutions, ELKI is an open-source Java data mining toolkit that contains several anomaly detection algorithms.

Anomaly detection techniques for use herein may include: Density-based techniques (k-nearest neighbor,[7][8][9] local outlier factor,[10] isolation forests,[11] and many more variations of this concept[12]);

Subspace-[13] and correlation-based[14] outlier detection for high-dimensional data [15];
One-class support vector machines [16];
Replicator neural networks [17];
Bayesian Networks [17];
Hidden Markov models (HMMs) [17]
Cluster analysis-based outlier detection [18][19];
Deviations from association rules and frequent itemsets;
Fuzzy logic-based outlier detection;
Ensemble techniques, using feature bagging,[20][21] score normalization[22][23] and different sources of diversity [24][25].

More generally, categories of anomaly detection techniques described by Wikipedia which may be used herein include:
1. Unsupervised anomaly detection techniques which detect anomalies in an unlabeled test data set e.g. under the assumption that the majority of the instances in the data set are normal by looking for instances that seem to fit least to the remainder of the data set.
2. Supervised anomaly detection techniques which use a data set of items respectively labeled as "normal" and "abnormal" and trains a classifier accordingly.
3. Semi-supervised anomaly detection techniques which construct a model representing normal behavior from a given normal training data set, and then test the likelihood of a test instance to be generated by the learnt model.

Figure 7:
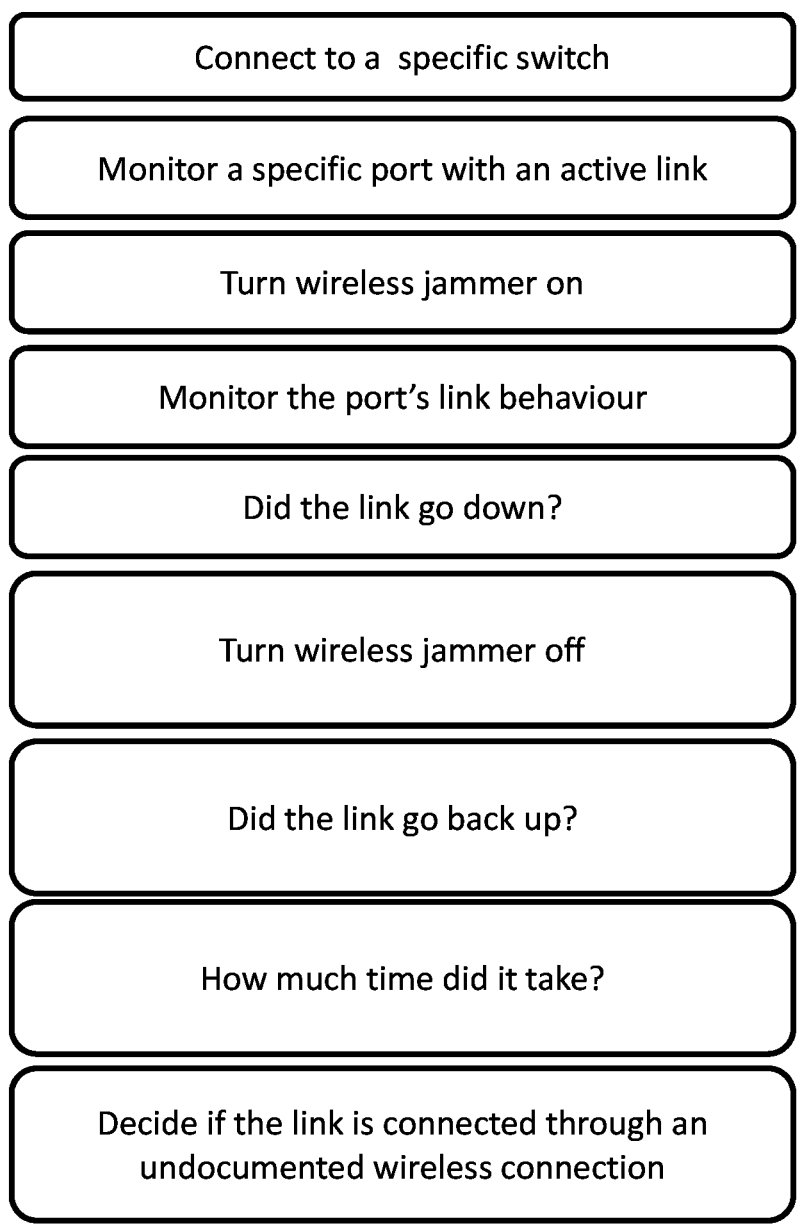
FIG. 7 is an example flow of incorporating jamming signals to aid in the detection process.

Reference is now made to FIGS. 6-8, of which:
FIG. 6 is an example flow for deep physical finger printing analysis;
FIG. 7 is an example flow of incorporating jamming signals to aid in the detection process; and
FIG. 8 is an example flow of aggregated insight resulting in a detection indication.

These flows may for example be performed by a "prime" software module.

The method of FIG. 6 may include all or any subset of the following operations, suitably ordered e.g. as follows:
Connect to a specific switch (e.g. via SSH/Telnet);
Get Switch access details through TACAS/RADIUS (user credentials may be needed so these may be used to login to the switch);
Read Switch Basic Information to determine which reference to use e.g. to understand what is the switch supported including, say, how many ports it has, does it have multiple cards, and if so, which, etc.;
Read each port's PHY registers value which is typically responsible for most of the raw physical layer information);
Read layer 2 values (including MAC address of connected device) (like CDP commands).

Some of the information related to auto-negotiation described herein is that mentioned in the above 2 Read operations (reading of each port's PHY registers value and reading of Read layer 2 values.

The auto-negotiation process typically results in a specific set of PHY layer parameters. Compare true read values with expected values (according to the end-connected device);
Compare true read values of PHY with DB records for that device;
Determine the level of authenticity according to the above comparison results.

The method of FIG. 7 may include all or any subset of the following operations, suitably ordered e.g. as follows:
Connect to a specific switch
Monitor a specific port with an active link
Turn wireless jammer on
Monitor the port's link behavior
Did the link go down?
Turn wireless jammer off
Did the link go back up?
How much time did it take?
Decide if the link is connected through an undocumented wireless The method of FIG. 8 may include all or any subset of the following operations, suitably ordered e.g. as follows:
Connect to a specific switch and query a specific port
Generate analog insight
Generate timing insight
Generate PHY data with layer 2 consistency comparison
Generate port's "Transparent" device.

An example system architecture is now described; components may be installed locally on the workstations and servers and/or deployed locally (e.g. on-premise), on a public cloud, or on a private cloud.

The system aka Security Suite is modular and includes a Transparent Network Devices Detection functional module which typically comprises a processor configured to continuously monitor the network searching for rogue network (LAN) devices that are transparent to existing security tools. This function is particularly useful because transparent devices have no network entity of their own (no IP address, no MAC address etc.) yet may be used for getting an invisible foothold in the target network, and for leaking sensitive information in an out-of-band manner, while the existing tools are blind.

The Network Security module may run as part of a SepioPrime management server and may communicate with existing Cisco network infrastructure to collect and analyze low level device information regarding the elements that are connected to the switch ports.

The software typically computes the real-time fingerprints of the devices that are connected to the switch ports and compares them against a known set of malicious devices together with specific network topology related information.

As a result, the system can typically detect and report on the existence of transparent and ghost devices, that otherwise are completely invisible by the existing security tools. The system administrator can typically define the scanning and monitoring profile and parameters and configure the interfaces for reporting on discovery of malicious devices.

A visibility report typically provides the administrator with a list of suspected devices, and to where each device is physically connected.

A SepioPrime subsystem may serve as a modular on-premise server system, whereas a NetDev Engine is a part of the system that shares and utilizes the common infrastructure functions and capabilities. The NetDev Engine is typically configured for communicating with the communications infrastructure of the organization, and/or to poll, and/or monitor, and/or analyze the low-level information including detecting existence of malicious transparent elements in the network.

The system administrator can define or import a list of Cisco switches, and set the specific functions related to their polling—when and how often to scan, is it allowed (or not) and when to toggle the link status of ports, what to do when a malicious devices is detected, etc.

The system then autonomously runs based on the defined scanning policy, and will detect and report on the existence of transparent or rogue LAN devices.

The Transparent Network Devices Detection module can store the needed switch access credential information internally, or interface to an existing TACACS+system for obtaining single-use or temporary access rights.

An integrated PostgreSQL database image may be used to store and retrieve the network device parameters. Typically the database is not exposed and is therefore accessible only internally by the NetDev Engine.

A Cloud Service is typically provided to give an additional layer of deeper device fingerprinting analysis that is combined with threat intelligence regarding malicious devices that are detected in real environments. The use of the SepioCloud Service typically is optional—if an enterprise configures its SepioPrime to connect with SepioCloud, the overall level of security and the probability of detecting transparent network devices in that organization is improved due to the deeper analysis.

Examples of Network Security Messages, all or any subset of which may be provided, are shown in FIGS. 12a-12d (for switches) and in FIGS. 13a-13c (for ports) where FIG. 12a is a New Switch Added message, FIG. 12b is a Successfully Connected to a Switch message, FIG. 12c is an Unable to Connect to a Switch message, FIG. 12d is a Switch Disconnected message, FIG. 13a is a Port Alert message, FIG. 13b is a Port Link Down message (typically only when transitioning from Alert), and FIG. 13 is a Port Alert Off message (typically only when transitioning from Alert).

Many advantages are accrued by the various embodiments herein, such as but not limited to the following listing.

It is appreciated that the system herein is advantageous since it prevents a wide variety of network attacks such as, for example:

(a) a PocketPort Inline Hijacking including adding a "virtual cable" inline the communication between an endpoint (PC or any other network device) and the enterprise switch. All the communications remain completely transparent and unchanged, and even security certificates can pass through (e.g. if 802.1X is configured in the network, the certificate will pass on through the virtual cable and from the network perspective everything will be successfully verified to be secure). However, as communications exit then return into the network, they are subject to eavesdropping and manipulation. For example, using a pair of ProxyCast PocketPort2 devices connected inline between the Target PC and the network switch by disconnecting the "legitimate" cable between the Target PC and the network switch, the attack flow may be as follows:

I. The two Attacking Devices connect to a switchboard server on the Internet (using the cellular modems as an example).
II. Both Attacking devices form a "virtual cable" through the switchboard.
III. The RJ45 ports are connected inline—one towards the target PC and the other to the switch port (or wall outlet).
IV. All communication and certificates run transparently.
V. The switchboard server can log and manipulate the traffic.

(b) MT300N MAC Cloning attack: cloning the MAC address of a valid and recognized device in the network, without having physical access to the device. All communications between Target Device and network remain completely unchanged, yet as communications go through the attacking device, they are subject to eavesdropping and manipulation. The Attack Flow may be:

I. The Attacking Devices (e.g. GL.Inet MT300N configured to clone the MAC address of the Target Device towards the WAN) is installed between the Target Device and the network.
II. The Attacking Device clones the MAC address of the Target Device.
III. An Attacker can eavesdrop or manipulate the traffic, can inject malicious traffic into the network impersonating himself as the legitimate (aka target) Device.

(c). MiTM attack conducted by placing a rogue device (e.g. Raspberry Pi WebSploit) between network elements. The Flow may be:
I. The two Attacking Devices (e.g. Raspberry Pi 3 Configured to act as a transparent MiTM) connection between a Target Device and the Network ((e.g. are connected inline between the Target PC and the network switch).
II. An Attacker connects to the Attacking Device in order to gain control.
III. An Attacker launches the WebSploit set of tools.

These attacks are typically prevented by alerting to the presence of the attacking devices thereby allowing them to be found and removed, after optional verification of the alert e.g. by the IT engineers of the networked organization aka enterprise.

A case study of penetration into a network of a financial institution, using transparent network devices, is now described, to clarify advantages of certain embodiments.

A Tier 1 bank audit revealed some irregularities, and it became evident that an external party had continuous access to the internal and secured parts of the network. investigation first includes on a thorough and rigorous scanning of the computing assets of the bank, such as the servers, the desktop workstations and management's laptops, for malware with remote access capabilities. As this phase revealed no findings, the second operation was deep monitoring of the ingoing and outgoing communications from the network, hoping it would provide a clue. Finding no evidence for the full remote access, the team was clueless and approached the Cybersecurity Investigations Practice of a leading global consulting firm for assistance. Working together, the teams discovered that an authentic Laptop of the bank was entirely cloned, and was connecting to the network infrastructure via an out-of-band channel in parallel to the existing and legitimate Laptop.

It was then clear why none of the existing security and monitoring tools could detect this, as the network access profile and envelope, as well as the certificate, were authentic and valid. The attackers were using a "ghost" malicious device that was acting in the shadow of the legitimate one. Once they finally became aware which valid device was the shadow hiding the criminal activities, the investigating team was then able to find an unrecognized and small hardware device that was installed in one of the distribution cabinets and was providing the remote access capabilities leaving the bank's many existing security measures entirely blind. No one from the IT and Network Teams knew what this device was, what it was doing, who had brought it in, or when.

In particular, the attackers were using a legitimate off-the-shelf network router sold by a third party (PocketPort2 mobile router from Proxicast). Among its other modes of operation, the router supports a virtual cable mode, in which it is possible to pair two devices and then install each one of them at a different location and use them as if they were interconnected using a standard passive LAN cable. The two devices are then able to reroute and tunnel the communication via a simple switchboard application, and then intercept the traffic, easily inject data packets and streams back into the network, or conduct more complex MiTM attacks. When operating in this virtual cable mode, the attack setup becomes invisible to all Intrusion Detection (IDS), Network Access Controller (NAC), and Network Monitoring tools—mainly due to the fact that the devices do not have any logical entity or footprint such as an IP or even MAC address. The entire manipulation is conducted on the Physical Layer (Layer 1) and the Data-Link Layer (Layer 2) so all higher-level communications are considered to be authentic and safe.

The device pair were configured by the attacker to run in virtual cable mode, and to use a private switchboard server in order that there will not be any traces to the location and origin of the attackers.

Other tools that are apt to cause the above problem are mAP lite and AR150—both legal legitimate products easily purchased from reputable vendors.

The bank in question then elected to install (hybrid on-premises and cloud deployment) a system configured in accordance with embodiments herein as a detection tool for manipulated hardware devices operating in the physical layer. During a trial, various types of rogue network elements were added into the network by the IR team, and were successfully detected and located by the system due to its physical layer detection technology, which greatly facilitates identification of network-invisible attack tools, and thus can stop rogue hardware before it jeopardizes normal enterprise operations.

Certain embodiments of the system herein provide a physical layer-based LAN security solution, and, unlike the MAC layer, the physical layer cannot be fooled by an intruder or hacker.

Certain embodiments of the system herein are advantageous in having a low false alarm rate such that network IT staff are only infrequently, if at all, asked, un-necessarily, to look for implants or malicious devices all along the line from the switch to the computer end-point.

Certain embodiments of the system herein can be deployed 100% on-premises without any external components, or over a public or private cloud infrastructure. A DOCKER container based SepioPrime subsystem (operative to aggregate information from a distributed setup of agents installed on plural PC machines) may use read-only access to the existing network switches using the SSH CLI interface and may use Telnet for communicating with several older switches that do not support SSH. The AAA interface (Radius and TACACS+) may be used for managing the CLI and PRIV access to the switches, and a northbound interface may be configured to report to the enterprise's SIEM and SOC systems whenever a rogue device is detected, identified, and located in the network. Syslog and SNMP traps may be used for logging of status and detection events, and may later be analyzed using Splunk.

It is appreciated that terminology such as "mandatory", "required", "need" and "must" refer to implementation choices made within the context of a particular implementation or application described herewithin for clarity and are not intended to be limiting, since, in an alternative implementation, the same elements might be defined as not mandatory and not required, or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device, or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The system may, if desired, be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein, may be deployed in a cloud environment. Clients e.g. mobile communication devices such as smartphones, may be operatively associated with, but external to the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Any "if-then" logic described herein is intended to include embodiments in which a processor is programmed to repeatedly determine whether condition x, which is sometimes true and sometimes false, is currently true or false and to perform y each time x is determined to be true, thereby to yield a processor which performs y at least once, typically on an "if and only if" basis e.g. triggered only by determinations that x is true, and never by determinations that x is false.

Features of the present invention, including operations, which are described in the context of separate embodiments, may also be provided in combination in a single embodiment. For example, a system embodiment is intended to include a corresponding process embodiment, and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly although not limited to those described in the Background section or in publications mentioned therein.

Conversely, features of the invention, including operations, which are described for brevity in the context of a single embodiment or in a certain order may be provided separately or in any suitable sub-combination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, Smart Phone (e.g. iPhone), Tablet, Laptop, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

The invention claimed is:

1. A network security system for detecting MAC'less/transparent devices, the system comprising:
a data repository aka DB, operative to accumulate "fingerprint" data indicative of expected physical level characteristics for each of plural types of switch-device links (aka link types) interconnecting a switch and a hardware device, wherein at least one pair of links (i.e. at least 2 instances of links) of different types differ from one another at least with respect to a chipset residing in the respective device connected to the respective switch by each respective link;
apparatus for reading physical level characteristics of links in at least one network to be protected; and
an output device configured to generate alerts of possible presence of a transparent device along at least one link if the physical level characteristics of said at least one link, as read by said apparatus, is anomalous relative to said "fingerprint" data stored in said data repository, wherein
said "fingerprint" data is analyzed by the following operations A-H:
A—connect to a specific switch (e.g. via SSH/Telnet);
B—get switch access details;
C—read Switch Basic Information to determine which reference to use;
D—read a PHY registers value of each port;
E—read layer 2 values including a MAC address of an end-connected device;
F—compare true read values with values which are expected given the end-connected device thereby to yield a first comparison result;
G—compare true read values of PHY with DB records for the end-connected device, thereby to yield a second comparison result; and
H—determine a level of authenticity of said end-connected device according to said comparison results.

2. A system according to claim 1 wherein said apparatus for reading physical level characteristics comprises a controller which issues to switches, commands which cause the switches to read the physical level characteristics of at least one link and to convey the physical level characteristics of said at least one link, as read, to the controller.

3. A system according to claim 2 wherein said commands comprise at least one "show" command.

4. A system according to claim 2 wherein said commands comprise a "show controllers Ethernet-controller" command.

5. A system according to claim 4 wherein said "show controllers Ethernet-controller" command is given at least once, by said apparatus for reading, with a PHY keyword.

6. A system according to claim 2 wherein said commands comprise a command which induces at least one switch to present, to the system, contents of interface internal registers.

7. A system according to claim 2 wherein said commands comprise a command which induces at least one switch to provide, to the system, a status of internal registers on at least one switch physical layer device (PHY) for at least one of the device or an interface to the device.

8. A system according to claim 2 wherein said commands comprise a command which induces at least one switch to display per-interface send and receive statistics read from hardware.

9. A system according to claim 2 wherein said expected physical level characteristics comprise at least one of PHY registers settings, timing parameters, and PoE information.

10. A system according to claim 1 wherein the data repository includes physical layer characteristics based on physical layer-level data stored in at least one PHY register.

11. A system according to claim 1 and also comprising machine learning functionality configured to update the "fingerprint" data based on data, provided by at least one enterprise, indicating which alerts were false alarms.

12. A system according to claim 11 wherein at least one output of said machine learning functionality is used to fingerprint at least one new malicious device, without actually possessing and connecting a physical instance of the at least one new malicious device, by using offline data or data sheet documentation.

13. A system according to claim 1 wherein said apparatus for reading is operative to read physical level characteristics of links in each of plural networks to be protected in plural enterprises and said output device configured to generate alerts to each of the plural enterprises.

14. A system according to claim 13 wherein at least one fingerprint in said data repository is used to identify anomalous physical level characteristics in plural enterprises' networks.

15. A system according to claim 1 wherein the system requests, from IT personnel, data as to whether a network implant aka malicious device was found at a certain link or not, and, if so, whether the malicious device was of a predicted model x or not and wherein said data is received and stored and used as test and/or validation sets for machine learning and wherein at least one output of said machine learning is used to update said "fingerprint" data.

16. A system according to claim 1 wherein the system receives, from each individual switch from among plural switches, the MACs of each device allegedly connected to said individual switch.

17. A system according to claim 1 wherein, each time a match between compared values is below a threshold, the system typically analyzes identical or similar network devices and when an anomaly is detected and the threshold is crossed, a user is notified, including using prior knowledge of device modeling by analyzing plural devices including a device D thereby to yield plural fingerprints for the plural devices which are stored in a data repository and subsequently, based on prior knowledge of device modeling for the device D, each time the system encounters a device D' from a series of the device D and having the same or a similar MAC prefix as the device D, the system expects the device D' to behave the same as the stored fingerprint for the device D, and if the device D' does not behave the same as the stored fingerprint for the device D, the system generates an alert.

18. A network security method for detecting MAC'less/transparent devices, the method comprising:
  in a data repository, accumulating "fingerprint" data indicative of expected physical level characteristics for each of plural types of switch-device links interconnecting a switch and a hardware device, wherein at least one pair of links of different types differ from one another at least with respect to a chipset residing in the respective device connected to the respective switch by each respective link;
  reading physical level characteristics of links in at least one network to be protected; and
  generating alerts of possible presence of a transparent device along at least one link if the physical level characteristics of said at least one link, as read, is anomalous relative to said "fingerprint" data stored in said data repository, wherein
  the method also comprises using machine learning functionality to update the "fingerprint" data based on data, provided by at least one enterprise, indicating which alerts were false alarms, and
  central or client DB s are modified with information collected using said machine learning functionality.

19. A method according to claim 18 wherein, as more servers are deployed, an aggregated database of devices which includes specific layer 1 profiling details of every Ethernet device, is collected.

20. A method according to claim 18 wherein, each link L in the network, whose PHY-layer characteristics match a malicious model is identified, and an alert is then sent that a malicious device of a model x has been identified at link L between a switch S and a networked device D in the network of an organization.

21. A method according to claim 18 wherein physical-layer characteristics of each link L' whose PHY-layer characteristics do not match any known and stored malicious device model fingerprints are analyzed including comparing PHY-layer characteristics of each link L' believed to be a link device of a model MD and switch of a model MS, to PHY-layer characteristics known to be typical of links between a device of the model MD and a switch of the model MS interconnected by link L'.

22. A method according to claim 21 wherein said PHY-layer characteristics are known to be typical of said links by fingerprinting, in advance, benign switches and other devices, rather than just malicious devices.

23. A method according to claim 21 wherein each time physical-layer characteristics reported by the switch responsive to show commands, are anomalous, relative to expected characteristics, an alert is sent, that a network implant aka malicious device whose model is unknown, has been identified along link L'.

24. A computer program product, comprising a non-transitory tangible computer readable medium having computer readable program code embodied therein, said computer readable program code adapted to be executed to implement a network security method for detecting MAC'less/transparent devices, the method comprising:
  in a data repository, accumulating "fingerprint" data indicative of expected physical level characteristics for each of plural types of switch-device links interconnecting a switch and a hardware device, wherein at least one pair of links of different types differ from one another at least with respect to a chipset residing in the respective device connected to the respective switch by each respective link;
  reading physical level characteristics of links in at least one network to be protected; and
  generating alerts of possible presence of a transparent device along at least one link if the physical level characteristics of said at least one link, as read, is anomalous relative to said "fingerprint" data stored in said data repository, wherein
  the method also comprises using machine learning functionality to update the "fingerprint" data based on data, provided by at least one enterprise, indicating which alerts were false alarms, and
  central or client DB s are modified with information collected using said machine learning functionality.

* * * * *